US011438114B2

(12) United States Patent
Au et al.

(10) Patent No.: US 11,438,114 B2
(45) Date of Patent: Sep. 6, 2022

(54) SYSTEM AND METHOD FOR AN ADAPTIVE FRAME STRUCTURE WITH FILTERED OFDM

(71) Applicant: Huawei Technologies Co., Ltd., Shenzhen (CN)

(72) Inventors: Kelvin Kar Kin Au, Kanata (CA); Jianglei Ma, Ottawa (CA); Liqing Zhang, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 139 days.

(21) Appl. No.: 16/932,505

(22) Filed: Jul. 17, 2020

(65) Prior Publication Data

US 2020/0351052 A1 Nov. 5, 2020

Related U.S. Application Data

(63) Continuation of application No. 16/222,650, filed on Dec. 17, 2018, now Pat. No. 10,721,041, which is a
(Continued)

(51) Int. Cl.
*H04L 5/00* (2006.01)
*H04L 27/26* (2006.01)
*H04L 5/06* (2006.01)

(52) U.S. Cl.
CPC ............ *H04L 5/0048* (2013.01); *H04L 5/003* (2013.01); *H04L 5/006* (2013.01); *H04L 5/0007* (2013.01);
(Continued)

(58) Field of Classification Search
CPC ............. H04L 5/0048; H04L 27/26025; H04L 5/0064; H04L 5/0076; H04L 5/0069;
(Continued)

(56) References Cited

U.S. PATENT DOCUMENTS 8,737,286 B2 5/2014 Golitschek Edler Von Elbwart et al.
8,811,544 B2 8/2014 Ma et al.
(Continued)

FOREIGN PATENT DOCUMENTS

CN 101282160 A 10/2008
CN 101449535 A 6/2009
(Continued)

OTHER PUBLICATIONS

3GPP TS 36.211 V12.2.0, 3rd Generation Partnership Project; Technical Specification Group Radio Access Network; Evolved Universal Terrestrial Radio Access (E-UTRA); Physical channels and modulation (Release 12), Jun. 2014, 121 pages.
(Continued)

*Primary Examiner* — Brian D Nguyen
(74) *Attorney, Agent, or Firm* — Slater Matsil, LLP

(57) ABSTRACT

Different filtered-orthogonal frequency division multiplexing (f-OFDM) frame formats may be used to achieve the spectrum flexibility. F-OFDM waveforms are generated by applying a pulse shaping digital filter to an orthogonal frequency division multiplexed (OFDM) signal. Different frame formats may be used to carry different traffic types as well as to adapt to characteristics of the channel, transmitter, receiver, or serving cell. The different frame formats may utilize different sub-carrier (SC) spacings and/or cyclic prefix (CP) lengths. In some embodiments, the different frame formats also utilize different symbol durations and/or transmission time interval (TTI) lengths.

52 Claims, 12 Drawing Sheets

Related U.S. Application Data continuation of application No. 15/977,850, filed on May 11, 2018, now Pat. No. 10,200,172, which is a continuation of application No. 15/004,430, filed on Jan. 22, 2016, now Pat. No. 9,985,760.

(60) Provisional application No. 62/140,995, filed on Mar. 31, 2015.

(52) U.S. Cl.
CPC .......... *H04L 5/0064* (2013.01); *H04L 5/0069* (2013.01); *H04L 5/0076* (2013.01); *H04L 27/2602* (2013.01); *H04L 27/264* (2013.01); *H04L 5/06* (2013.01); *H04L 27/2607* (2013.01)

(58) Field of Classification Search
CPC ....... H04L 5/003; H04L 27/264; H04L 5/006; H04L 5/0007; H04L 27/26412; H04L 27/2602; H04L 5/06; H04L 27/2607
See application file for complete search history.

(56) References Cited

U.S. PATENT DOCUMENTS

| | | |
|---|---|---|
| 9,131,498 B2 | 9/2015 | Au et al. |
| 9,509,464 B2 | 11/2016 | Cai et al. |
| 9,838,545 B2* | 12/2017 | Clausen ................ H04L 5/0042 |
| 10,158,516 B2* | 12/2018 | Choi .................... H04L 5/0044 |
| 2005/0063345 A1 | 3/2005 | Wu et al. |
| 2007/0155387 A1 | 7/2007 | Li et al. |
| 2008/0260085 A1* | 10/2008 | Lin ..................... H04L 27/2659 375/362 |
| 2009/0092090 A1 | 4/2009 | Beems Hart et al. |
| 2010/0120112 A1 | 5/2010 | Trejo Estrada et al. |
| 2010/0255851 A1 | 10/2010 | Kwak et al. |
| 2011/0032850 A1 | 2/2011 | Cai |
| 2011/0201341 A1 | 8/2011 | Choudhury et al. |
| 2012/0045017 A1 | 2/2012 | Pande et al. |
| 2012/0093065 A1 | 4/2012 | Golitschek Edler Von Elbwart et al. |
| 2013/0051485 A1 | 2/2013 | Taori et al. |
| 2014/0032987 A1* | 1/2014 | Nagaraj ........... H04N 21/44209 714/E11.131 |
| 2014/0146772 A1 | 5/2014 | Kwak et al. |
| 2014/0198865 A1 | 7/2014 | Pietsch et al. |
| 2014/0219255 A1 | 8/2014 | Eyuboglu et al. |
| 2015/0016239 A1 | 1/2015 | Yi et al. |
| 2015/0215148 A1 | 7/2015 | Taori et al. |
| 2015/0229502 A1 | 8/2015 | Vilaipornsawai et al. |
| 2015/0282178 A1 | 10/2015 | Kim et al. |
| 2015/0304146 A1 | 10/2015 | Yang et al. |
| 2015/0372843 A1 | 12/2015 | Bala et al. |
| 2016/0219582 A1 | 7/2016 | Tiirola et al. |
| 2016/0261325 A1 | 9/2016 | Ko et al. |
| 2017/0281003 A1* | 10/2017 | Fuchs ................... H04W 40/02 |
| 2018/0192349 A1* | 7/2018 | Agee .................. H04W 72/085 |
| 2020/0213168 A1* | 7/2020 | Bala ................. H04L 25/03834 |
| 2021/0068102 A1* | 3/2021 | Marinier ........... H04W 72/0413 |

FOREIGN PATENT DOCUMENTS

| | | |
|---|---|---|
| CN | 101577857 A | 11/2009 |
| CN | 101855880 A | 10/2010 |
| CN | 102740375 A | 10/2012 |
| EP | 2840749 A1 | 2/2015 |
| EP | 2843892 A1 | 3/2015 |
| EP | 2911321 A1 | 8/2015 |
| JP | 2009273174 A | 11/2009 |
| JP | 2014112904 A | 6/2014 |
| WO | 2013046375 A1 | 4/2013 |
| WO | 2014065563 A1 | 5/2014 |
| WO | 2014085710 A1 | 6/2014 |
| WO | 2014123926 A1 | 8/2014 |

OTHER PUBLICATIONS

Docomo 5G White Paper, "5G Radio Access: Requirements, Concept and Technologies," NTT Docomo, Inc., Jul. 2014, 13 pages.

Jialing Li et al., "A Resource Block Based Filtered OFDM Scheme and Performance Comparison," InterDigital Communications, LLC, Melville, NY, May 6, 2013, 5 pages.

Ma, Jianglei, "Software Defined Air Interface,—Air interface Design Paradigm Shift for 5G," Dec. 8, 2014, 15 pages.

Samsung, "Considerations of sub-band scheduling for 1.4 MHz MTC UE," 3GPP TSG RAN WG1 Meeting #80, R1-150351, Athens, Greece, Feb. 9-13, 2015, 3 pages.

* cited by examiner

SYSTEM AND METHOD FOR AN ADAPTIVE FRAME STRUCTURE WITH FILTERED OFDM

This application is a continuation of U.S. patent application Ser. No. 16/222,650 (now U.S. Pat. No. 10,721,041), filed on Dec. 17, 2018 and entitled "System and Method for an Adaptive Frame Structure with Filtered OFDM," which is a continuation of U.S. patent application Ser. No. 15/97,850, (now U.S. Pat. No. 10,200,172), filed on May 11, 2018 and entitled "System and Method for an Adaptive Frame Structure with Filtered OFDM" which is a continuation of U.S. patent application Ser. No. 15/004,430 (now U.S. Pat. No. 9,985,760), filed on Jan. 22, 2016 and entitled "System and Method for an Adaptive Frame Structure with Filtered OFDM," which claims priority to U.S. Provisional Application No. 62/140,995, filed on Mar. 31, 2015 and entitled "System and Method for an Adaptive Frame Structure with Filtered OFDM," all of which applications are hereby incorporated by reference herein as if reproduced in their entireties.

TECHNICAL FIELD

The present invention relates to a system and method for wireless communications, and, in particular embodiments, to a system and method for an adaptive frame structure with filtered orthogonal frequency division multiplexing (OFDM).

BACKGROUND

As mobile devices are increasingly used to access streaming video, mobile gaming, and other assorted services, next-generation wireless networks may need to support diverse traffic types while also satisfying overall network and channel performance requirements. The different traffic types may have different characteristics, including different quality of service (QoS) requirements (e.g., latency, packet loss, jitter, etc.). Accordingly, techniques for efficiently communicating diverse traffic types over resources of a wireless network are needed to enable next-generation wireless networks to satisfy the demands of tomorrow.

SUMMARY OF THE INVENTION

Technical advantages are generally achieved, by embodiments of this disclosure which describe a system and method for an adaptive frame structure with filtered OFDM.

In accordance with an embodiment, a method for transmitting signals in a wireless network is provided. In this example, the method includes transmitting a first filtered-orthogonal frequency division multiplexing (f-OFDM) signal, and transmitting a second f-OFDM signal. The first f-OFDM signal and the second f-OFDM signal are communicated in accordance with different sub-carrier spacings than one another. An apparatus for performing this method is also provided.

In accordance with another embodiment, a method for receiving signals in a wireless network is provided. In this example, the method includes receiving a first filtered-orthogonal frequency division multiplexing (f-OFDM) signal, and receiving a second f-OFDM signal. The first f-OFDM signal and the second f-OFDM signal are communicated in accordance with different sub-carrier spacings than one another. An apparatus for performing this method is also provided.

In accordance with an embodiment, a method for transmitting signals in a wireless network is provided. In this example, the method includes transmitting, by a transmitter, a first transmission in a default sub-band with default orthogonal frequency divisional multiplexing (OFDM) parameters to a first user equipment (UE) when the UE initially accesses a network, and transmitting, by the transmitter, higher-layer signaling to the first UE in the default sub-band. The higher-layer signaling indicates at least one first OFDM additional parameters and one second OFDM parameters. The first OFDM additional parameters includes a first additional sub-band information and a first additional frame structure parameters, and the second OFDM parameters includes a second additional sub-band information and a second additional frame structure parameters. The first additional sub-band occupies a different frequency bandwidth partition than the second additional sub-band. A first sub-carrier spacing in the first additional frame structure parameters is different than a second sub-carrier spacing in the second additional frame structure parameters. The sub-carrier spacing in the default frame structure parameters comprises 15 kilohertz (kHz) and 30 kHz, and each of the first sub-carrier spacing and the second sub-carrier spacing is one from a predefined sub-carrier spacing set of 7.5 kHz, 15 kHz, 30 kHz, and 60 kHz. In one example, the bandwidth of the first additional sub band and the second additional sub band is 5 MHz. In the same example, or in another example, each of the first additional sub-band information and the second additional sub-band information comprises an index of a sub-band or an offset from a reference value associating with each sub-band. In any one of the above examples, or in another example, each of the first additional frame structure parameters and the second additional frame structure parameters further comprises cyclic prefix (CP) length and transmission time intervals (TTIs). In any one of the above examples, or in another example, the first additional frame structure parameters and the second additional frame structure parameters includes an index for each sub-carrier spacing. In any one of the above examples, or in another example, before the step of transmitting the first transmission, the method further comprises continuously transmitting, by the transmitter, the default frame structure parameters in time; or periodically transmitting, by the transmitter, the default frame structure parameters. In any one of the above examples, or in another example, a frame format (e.g., the frame format 302 from FIG. 3) is assigned to a semi-static allocation period (e.g., the semi-static allocation period 331), and another frame format (e.g., the frame format 309) is assigned to another semi-static allocation period (e.g., the semi-static allocation period 332). In any one of the above examples, or in another example, the default sub-band is a default filtered-orthogonal frequency-division multiplexing (f-OFDM) sub-band, and the additional sub-band is an additional f-OFDM sub-band.

In accordance with another embodiment, a method for transmitting signals in a wireless network is provided. In this example, the method includes transmitting, by a transmitter, a first transmission in a default sub-band with default orthogonal frequency divisional multiplexing (OFDM) parameters to a first user equipment (UE) when the UE initially accesses a network, and transmitting, by the transmitter, higher-layer signaling to the first UE in the default sub-band. The higher-layer signaling indicates at least a first set of alternative OFDM parameters and a second set of alternative OFDM parameters, the first set of alternative OFDM parameters including at least a first alternative sub-band, and a first alternative frame structure, and the second set of alternative OFDM parameters including a second alternative sub-band and a second alternative frame structure, wherein the first alternative sub-band occupies a different frequency bandwidth partition than the second alternative sub-band. The default frame structure parameters comprises at least one of a 15 kilohertz (kHz) subcarrier spacing and 30 kHz subcarrier spacing. The first frame structure and the second frame structure include one of a 7.5 kHz sub-carrier spacing, a 15 kHz sub-carrier spacing, a 30 kHz sub-carrier spacing, and a 60 kHz sub-carrier spacing. The first frame structure has a different sub-carrier spacing than the second frame structure. In one example, each of the first sub-band and the second—sub-band have a 5 megahertz (MHz) bandwidth. In the same example, or in another example, each of the first sub-band and the second sub-band are associated with an index of sub-band or offset from a reference value associating with each sub-band, the index or the offset being indicating by the higher-layer signaling. In any one of the above examples, or in another example, each of the first frame structure and the second frame structure comprises cyclic prefix (CP) length and transmission time intervals (TTIs). In any one of the above examples, or in another example, the first plurality of OFDM parameters includes a first index for a first sub-carrier spacing of the first frame structure, and wherein the second plurality of OFDM parameters includes a second index for a second sub-carrier spacing of the second frame structure. In such an example, the first sub-carrier spacing of the first frame structure may be different than the second sub-carrier spacing of the second frame structure. In any one of the above examples, or in another example, before the step of transmitting the first transmission, the method further comprises continuously transmitting, by the transmitter, the default frame structure parameters in time. In any one of the above examples, or in another example, the method further comprises periodically transmitting, by the transmitter, the default frame structure parameters. In any one of the above examples, or in another example, the default sub-band is a default filtered-orthogonal frequency-division multiplexing (f-OFDM) sub-band, and the first alternative sub-band is an alternative f-OFDM sub-band.

BRIEF DESCRIPTION OF THE DRAWINGS

For a more complete understanding of the present invention, and the advantages thereof, reference is now made to the following descriptions taken in conjunction with the accompanying drawing, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

Figure 1:
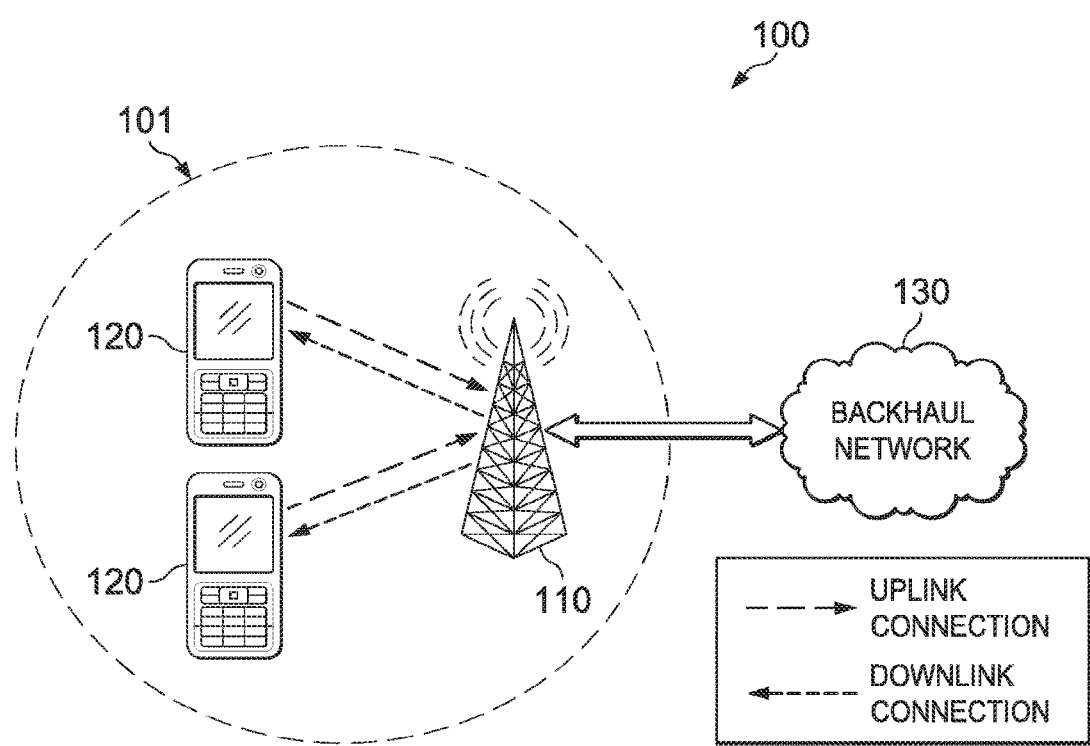
FIG. 1 illustrates a diagram of an embodiment wireless network.

The structure, manufacture and use of the embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Aspects of this disclosure utilize different filtered-orthogonal frequency division multiplexing (f-OFDM) frame formats to achieve the spectrum flexibility needed to support diverse traffic types in next-generation wireless networks. F-OFDM waveforms are generated by applying a pulse shaping digital filter to an orthogonal frequency division multiplexed (OFDM) signal. Embodiments of this disclosure use different frame formats to carry different traffic types as well as to adapt to characteristics of the channel, transmitter, receiver, or serving cell. The different frame formats utilize different sub-carrier (SC) spacings and/or cyclic prefix (CP) lengths. In some embodiments, the different frame formats also utilize different symbol durations and/or transmission time interval (TTI) lengths. As referred to herein, the terms "frame format" and "frame structure configuration" are used interchangeably.

As mentioned above, using different frame formats to communicate traffic may provide significant spectrum flexibility, as using different combinations of CP lengths, sub-carrier spacings, symbol durations, and TTI lengths has performance ramifications, e.g., latency, spectral efficiency, etc. In some embodiments, f-OFDM signals are assigned to different frame formats. The assignment may be based on any criteria, e.g., a characteristic of data carried in the respective f-OFDM signals, a characteristic of a wireless channel over which the f-OFDM signal is transmitted, a characteristic of a transmitter assigned to transmit the f-OFDM signal, a characteristic of a receiver assigned to receive the f-OFDM signal, etc. The assignment of frame formats to f-OFDM signals may be achieved in a variety of ways. In some embodiments, the frame formats are mapped to network resources, and the f-OFDM signals are transmitted in the network resource based on that mapping to achieve the appropriate frame format assignment. In one example, different frame formats are mapped to different frequency sub-bands, and the f-OFDM signals are assigned to whichever frequency sub-band is mapped to the appropriate frame format. In another example, different frame formats are mapped to different time periods, and the f-OFDM signals are assigned to whichever time period has the appropriate frame format. Frame formats having different parameters may be in the same frequency sub-band or different frequency sub-bands. In other embodiments, the frame formats may be directly assigned to the f-OFDM signals independent of resource scheduling. In such embodiments, the assigned frame format may be used to transmit the f-OFDM signal over whichever resources are assigned to carry the f-OFDM signal. This may achieve greater network flexibility, while potentially having higher overhead requirements by virtue of having to persistently coordinate which frame formats are being applied to which network resources. These and other aspects are described in further detail below.

FIG. 1 illustrates a network 100 for communicating data. The network 100 includes an access point (AP) 110 having a coverage area 101, a plurality of mobile devices 120, and a backhaul network 130. The AP 110 may be any component capable of providing wireless access by, among other things, establishing uplink (dashed line) and/or downlink (dotted line) connections with the mobile devices 120, such as a base station, an evolved Node B (eNB), a femtocell, and other wirelessly enabled devices. The mobile devices 120 may be any component capable of establishing a wireless connection with the AP 110, such as a mobile station (STA), a user equipment (UE), or other wirelessly enabled devices. The backhaul network 130 may be any component or collection of components that allow data to be exchanged between the AP 110 and a remote end. In some embodiments, there may be multiple such networks, and/or the network may comprise various other wireless devices, such as relays, low power nodes, etc.

Figure 2:
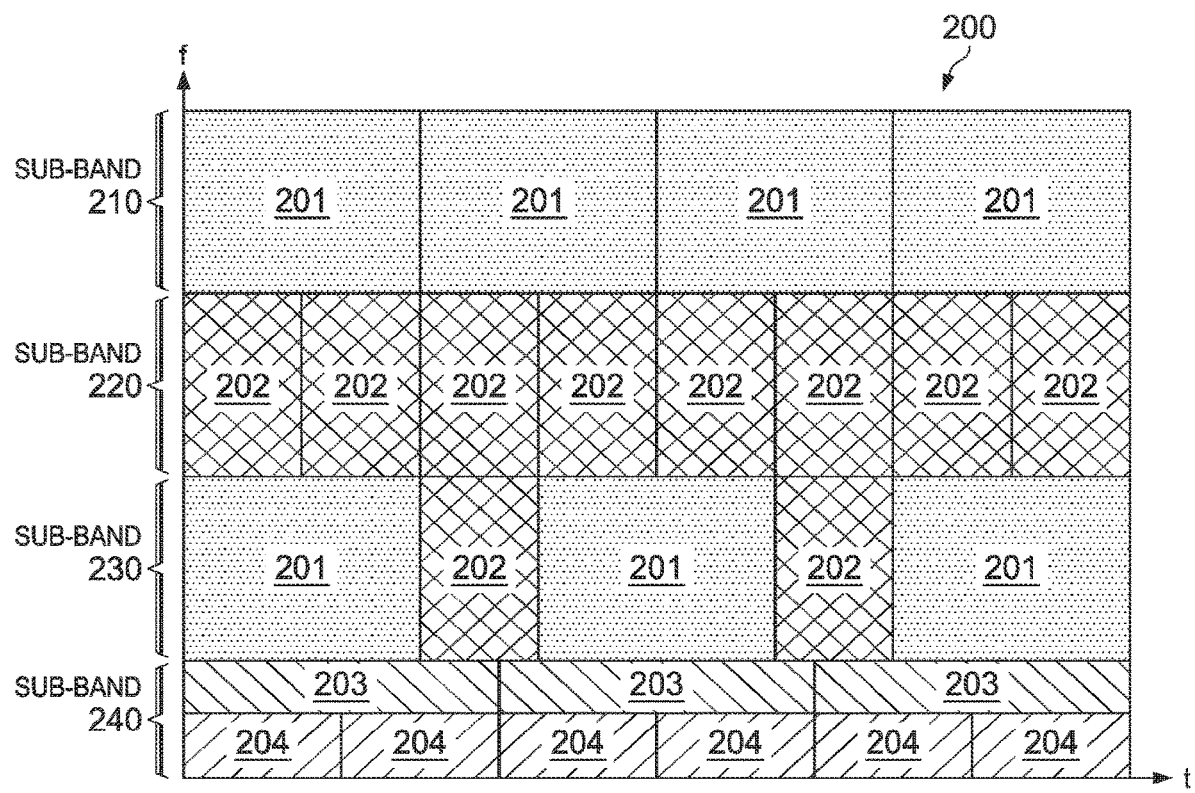
FIG. 2 illustrates a diagram of an embodiment filtered-orthogonal frequency division multiplexing (f-OFDM) configuration.

FIG. 2 illustrates a diagram of an embodiment filtered-orthogonal frequency division multiplexing (f-OFDM) configuration 200. As shown, the f-OFDM configuration 200 comprises frequency sub-bands 210, 220, 230, 240 over which different frame formats 201-204 are transmitted. Each of the different frame formats 201-204 has a different combination of frame parameters, e.g., CP-lengths, SC spacing, symbol duration, TTI length, etc. In some embodiments, different frame formats are assigned to different frequency sub-bands. In this example, the sub-band 210 is assigned the frame format 201, while the sub-band 220 is assigned the frame format 202. In other embodiments, different frame formats are assigned to be communicated at different time periods in the same frequency sub-band. In this example, the frame formats 201, 202 are assigned in a time division multiplexed (TDM) fashion. While an alternating pattern of two frame formats (i.e., the frame formats 201, 202) are depicted as being communicated over the sub-band 230, it should be appreciated that any pattern of frame formats, and any number of different frame formats, can be assigned to a frequency sub-band. In other embodiments, different frame formats may be communicated over different sub-carriers of the same frequency sub-band. In this example, the frame formats 203, 204 are communicated over different sub-carriers of the frequency sub-band 240. The bandwidths of the frequency sub-bands 210, 220, 230 and 240 can be changed over time. Other examples are also possible.

Figure 3:
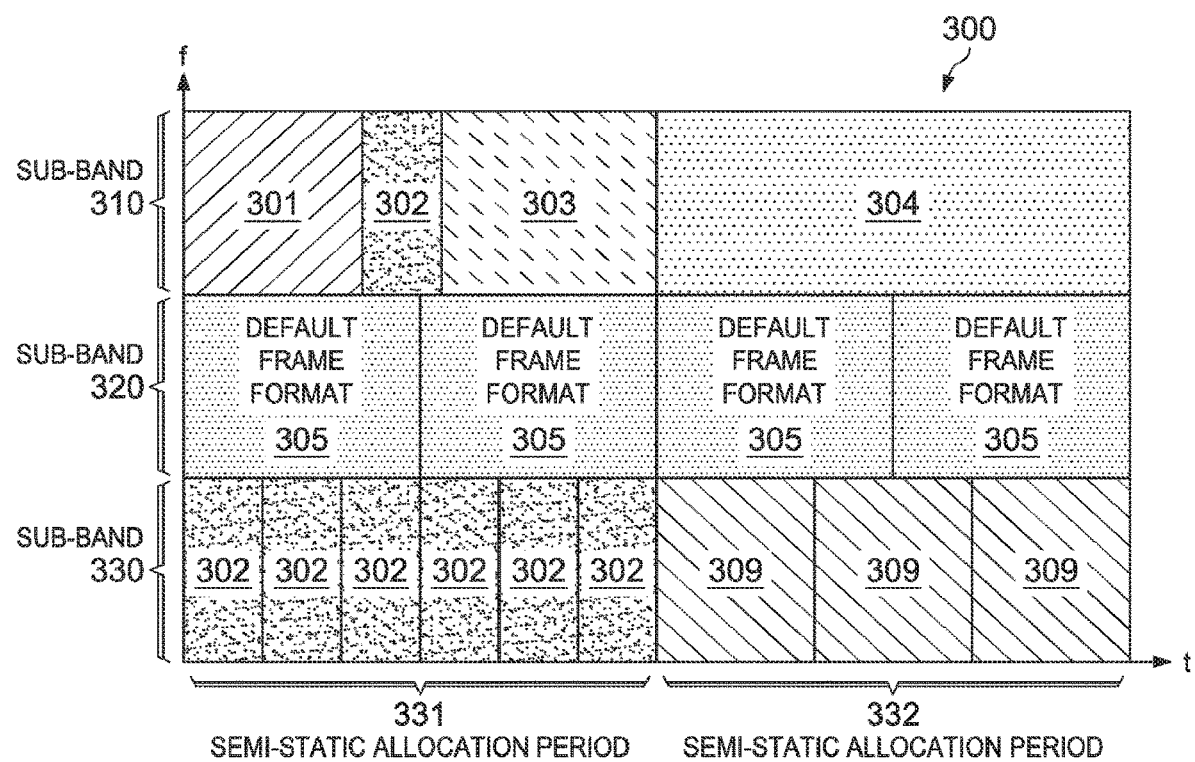
FIG. 3 illustrates a diagram of another embodiment f-OFDM configuration.

In some embodiments, frame formats can be assigned to f-OFDM signals communicated over one or more frequency sub-bands. FIG. 3 illustrates a diagram of another embodiment f-OFDM configuration 300. As shown, the f-OFDM configuration 300 comprises frequency sub-bands 310, 320, 330 over which different frame formats 301-309 are communicated. Each of the different frame formats 301-309 has a different combination of frame parameters, e.g., CP-lengths, SC spacings, symbol durations, TTI lengths, etc. In this example, the frequency sub-band 320 is assigned a default frame format 305. The frame format 305 may have a standard set of frame parameters (e.g., CP-length, SC-spacing, symbol duration, etc.) that is known by mobile devices. The default frame format 305 can be transmitted continuously in time or it can be transmitted periodically (e.g. "Config 1" in FIG. 7). This may allow mobile devices entering the wireless network to receive signals in the frequency sub-band 320. The frequency sub-band 320 may be used to assign frame formats to the frequency sub-band 310, as well as to assign frame formats to the frequency sub-band 330. Notably, dynamically assigning frame formats to the frequency sub-band 310 may allow a different frame format to be assigned to each f-OFDM signal on a frame-by-frame basis. In this example, the frame format 301 is assigned to a first f-OFDM signal communicated over the frequency sub-band 310, the frame format 302 is assigned to a second f-OFDM signal communicated over the frequency sub-band 310, the frame format 303 is assigned to a third f-OFDM signal communicated over the frequency sub-band 310, and the frame format 304 is assigned to a forth f-OFDM signal communicated over the frequency sub-band 310. The bandwidths of frequency sub-bands 310, 320 and 330 can be changed over time.

Semi-static configuration of frame formats in the frequency sub-band 330 may allow different frame formats to be assigned to different semi-static allocation periods 331, 332. Semi-static configuration of frame formats may generate less overhead than dynamic configuration of frame formats. In this example, the frame format 302 is assigned to the semi-static allocation period 331, and the frame format 309 is assigned to the semi-static allocation period 332.

Figure 4:
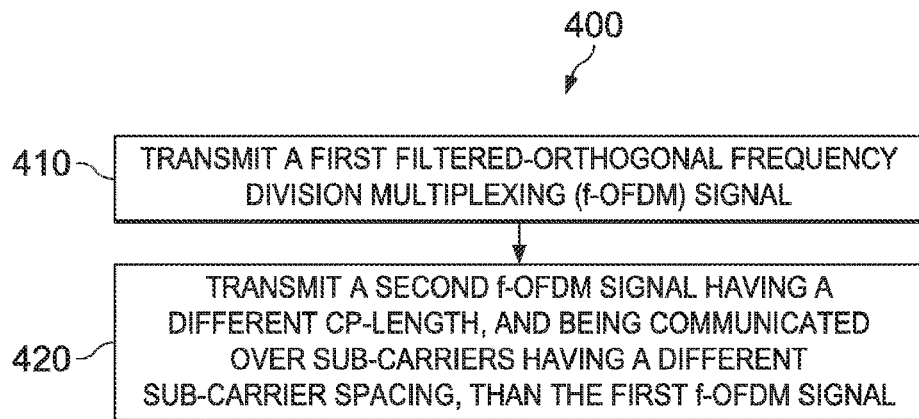
FIG. 4 illustrates a flowchart of an embodiment method for transmitting f-OFDM signals having different frame formats.

FIG. 4 illustrates an embodiment method 400 for transmitting f-OFDM signals having different frame formats, as may be performed by a transmitter. As shown, the method 400 begins at step 410, where the transmitter transmits a first f-OFDM signal. Next, the method 400 proceeds to step 420, where the transmitter transmits a second f-OFDM signal. Symbols carried by the second f-OFDM signal have a different CP-length than symbols carried by the first f-OFDM signal. Additionally, the second f-OFDM signal is communicated over sub-carriers having a different sub-carrier spacing than the first f-OFDM signal.

Figure 5:
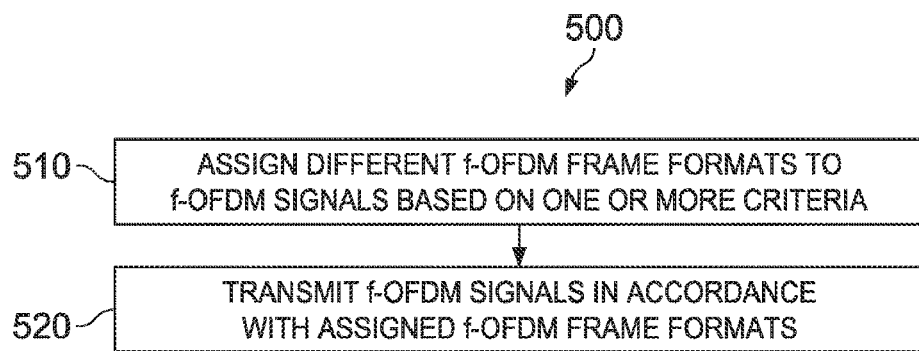
FIG. 5 illustrates a flowchart of another embodiment method for transmitting f-OFDM signals having different frame formats.

In some embodiments, different frame formats are assigned to different f-OFDM signals. FIG. 5 illustrates another embodiment method 500 for transmitting f-OFDM signals having different frame formats, as may be performed by a transmitter. As shown, the method 500 begins at step 510, where the transmitter configures different frame formats to f-OFDM subbands based on one or more criteria. Next, the method 500 proceeds to step 520, where the transmitter transmits the f-OFDM signals in accordance with the assigned frame formats.

The criteria used to make the frame format assignments may include various characteristics associated with the signal transmission. In one example, the criteria includes a characteristic of data carried in the respective f-OFDM signals, e.g., a latency requirement, a delay tolerance requirement, a traffic type, a service type, etc. In another example, the criteria includes a characteristic of a wireless channel over which the f-OFDM signals are transmitted, e.g., multipath delay characteristic, a path loss, etc. In yet another example, the criteria includes a characteristic of the transmitter, e.g., a serving region size, etc. In yet another example, the criteria includes a characteristic of the receiver assigned to receive the f-OFDM signal, e.g., a mobility speed of the receiver. The criteria may also include a combination of the above-mentioned characteristics.

Figure 6:
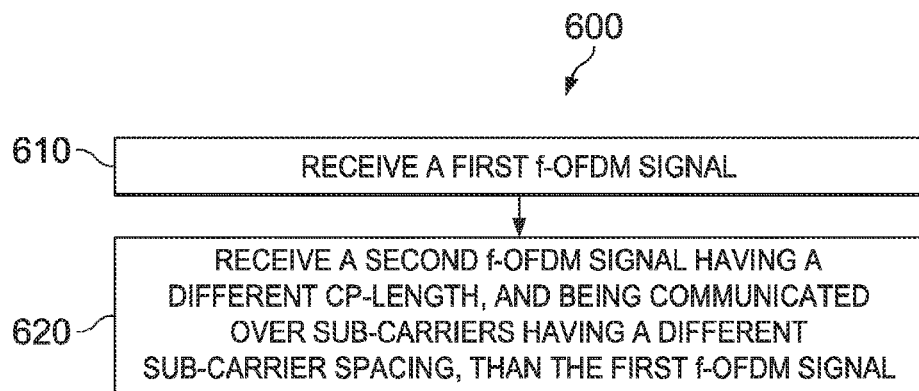
FIG. 6 illustrates a flowchart of an embodiment method for receiving f-OFDM signals having different frame formats.

In some embodiments, frames having different frame formats are received by a single receiver. FIG. 6 illustrates an embodiment method 600 for receiving f-OFDM signals having different frame formats, as may be performed by a receiver. As shown, the method 600 begins at step 61o, where the receiver receives a first f-OFDM signal. Next, the method 600 proceeds to step 620, where the receiver receives a second f-OFDM signal carrying symbols having a different CP-length than symbols carried by the first f-OFDM signal, as well as being communicated over sub-carriers having a different sub-carrier spacing than the first f-OFDM signal.

Current adaptive TTI design for 5G only works with the same subcarrier spacing and symbol duration. Various embodiments relate to frame structure design in the 5G air interface are provided. Embodiments provide a system and method for an adaptive and flexible frame structure (e.g., subcarrier spacing, symbol prefix/suffix, TTI length, etc.) in the same system bandwidth to work in filtered OFDM. Embodiments provide an adaptive frame structure (in which TTI is only one element, and subcarrier spacing and symbol prefix/suffix duration are others) that can coexist when combined with filtered OFDM in the same system bandwidth. Embodiments provide a more flexible solution to meet the diverse environment and traffic types of 5G systems due to the ability to accommodate different frame structure parameters, while at the same time enabling mobile devices to access such system easily.

Figure 7:
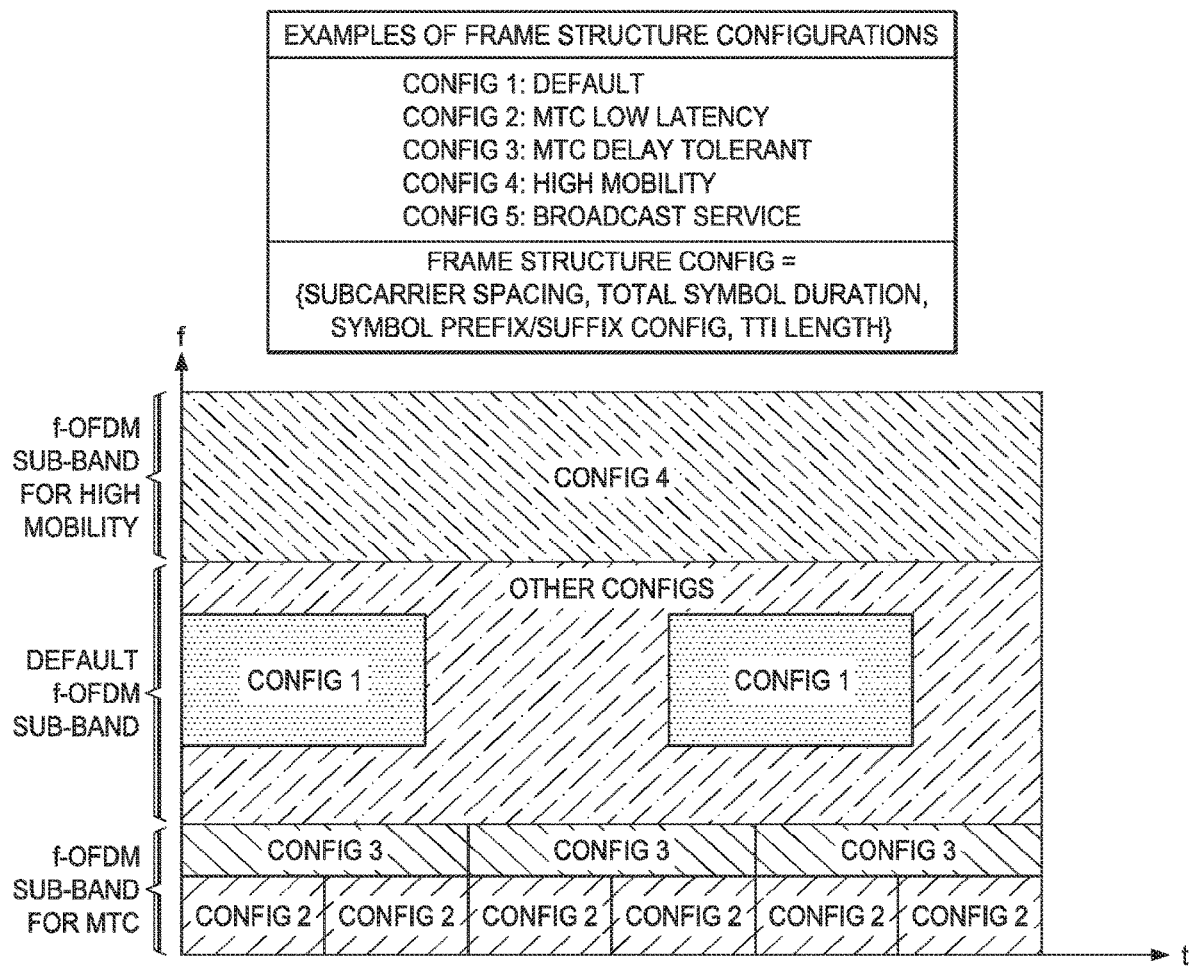
FIG. 7 illustrates a diagram of an embodiment f-OFDM configuration.

FIG. 7 illustrates examples of frame structure configurations, which include subcarrier spacing, total symbol duration, symbol prefix/suffix configuration, and TTI length. As illustrated in FIG. 7, Configuration 1 is a default configuration. Configuration 2 is a configuration for low latency machine-type communication (MTC), and configuration 3 is a configuration for delay tolerant MTC. Configuration 4 is for high mobility, and configuration 5 is for broadcast service. This is applicable for both downlink and uplink.

In the intra-f-OFDM sub-band, the frame structure configurations with the same subcarrier spacing and total symbol duration can coexist. The inter-f-OFDM sub-band includes configurations with different subcarrier spacing and total symbol duration. The default frame structure occurs in predefined time-frequency resources within a default f-OFDM sub-band. This occurs at predefined periods, not necessarily all of the time. It facilitates initial access by mobile device, and may be mandatory for downlink (DL), but optional for uplink (UL). The default frame structure can be a backward compatible frame structure configuration (e.g., long-term evolution (LTE)) or a 5G default frame structure configuration. This depends on, for example, carrier frequencies.

A mechanism for adaptive frame structure with f-OFDM according to embodiments is described as follows. First, a default frame structure parameter set (configuration) is defined (e.g., default subcarrier spacing, total symbol duration, TTI length, symbol overhead such as prefix/suffix length, etc.). Next, additional frame structure parameters sets (configurations) different from the default frame structure parameter set are defined. In an embodiment, the different f-OFDM sub-band frame structure has at least a different SC spacing and total symbol duration.

Figure 8:
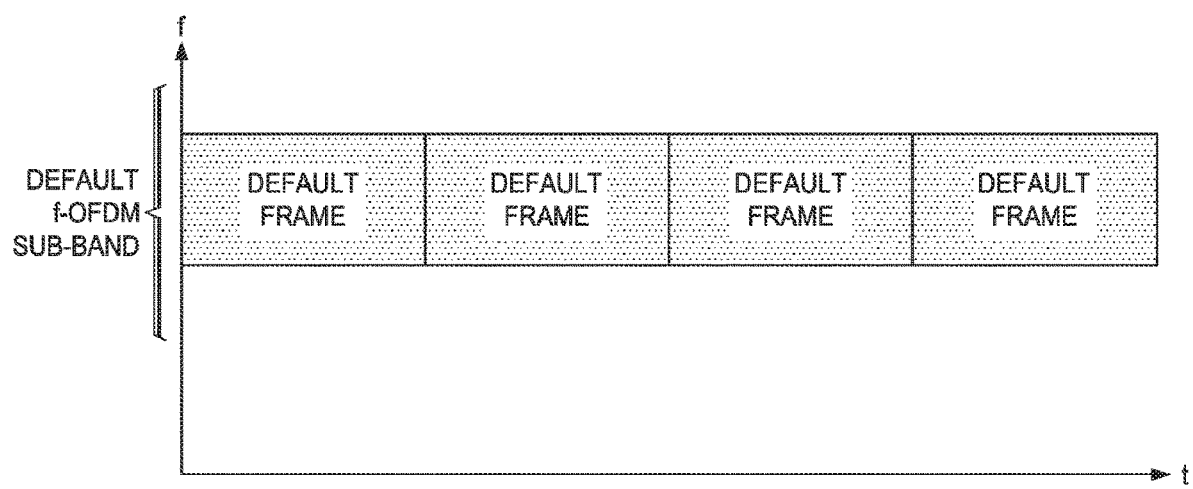
FIG. 8 illustrates a diagram of another embodiment f-OFDM configuration.

Next, the default frame structure is transmitted in predefined time-frequency resources within a default f-OFDM sub-band. This is known at both the network and the mobile device (e.g., located in the bandwidth (BW) around the carrier frequency for DL). The default f-OFDM sub-band is at least the BW of the time-frequency resources occupied by the default frame structure. The default frame structure can be used for carrying any type of traffic. FIG. 8 illustrates a default f-OFDM sub-band according to an embodiment. Finally, additional frame structures in other f-OFDM sub-bands are configured on demand.

Default frame structure parameter set embodiments include a default 5G frame structure parameter set that is different from that of LTE. An LTE frame structure parameter set may include, e.g., SC (sub-carrier spacing)=15 kHz, TI=1 ms, etc. Additional frame structure parameter set embodiments including frame structures for high speed and low speed, frame structures for a dispersive channel (e.g., outdoor) and a less dispersive channel (e.g., indoor), frame structures for different carrier frequencies, and frame structures for different traffic characteristics (e.g., latency). Table 1 lists the types of parameters that are well suited to different traffic/receivers. Table 2 lists example frame format parameters for a 7.5 kilohertz (KHz) sub-carrier spacing. Table 3 lists example frame format parameters for a 15 kilohertz (KHz) sub-carrier spacing. Table 4 lists example frame format parameters for a 30 kilohertz (KHz) sub-carrier spacing. Table 5 lists example frame format parameters for a 30 kilohertz (KHz) sub-carrier spacing. Table 6 illustrates example f-OFDM frame parameters selected from Table 1 to 5 for various configurations. The parameters may support smooth scalability of LTE in terms of subcarrier spacing (e.g., 7.5, 15, 30, 60 kHz). Embodiments include backward compatibility with the LTE basic time unit (or sampling frequency of 30.72 MHz). Various embodiments provide for narrow subcarrier spacing of 7.5 KHz along considering for device-to-device (D2D) or MTC. Various embodiments also support three types of CP for different environments, e.g., outdoor and indoor, large and small cells, e.g., mini CP (1-2 us), normal CP (~5 us) and extended CP (>5 us). Embodiments provide for reduced and varying CP overhead options, e.g., 1%~10%, and short and long TTs, e.g., able to form different frame sizes of, e.g., 0.15 ms, 1 ms, 5 ms, etc.

TABLE 1

| Configuration | SC-Spacing | Symbol Dur. | CP-Prefix | TTI |
|---|---|---|---|---|
| MTC Low Latency | small | long | long | short |
| MTC Delay Tolerant | small | long | long | medium |

TABLE 1-continued

| Configuration | SC-Spacing | Symbol Dur. | CP-Prefix | TTI |
|---|---|---|---|---|
| High Mobility | large | short | medium | medium |
| Broadcast Services | medium | medium | long | medium |

TABLE 2

| | Subcarrier spacing (KHz) | | | |
|---|---|---|---|---|
| | 7.5 | 7.5 | 7.5 | 7.5 |
| Useful duration T_u (us) | 133.333 | 133.333 | 133.333 | 133.333 |
| CP length (us) | 16.667 | 9.54/9.44 | 5.57/5.18 | 1.82/1.76 |
| CP length in Ts (=32.55 ns) | 512 | 293/290 | 171/159 | 56/54 |
| # of symbols per TTI | 1 | 6/1 | 35/1 | 25/12 |
| TTI (ms) | 0.150 | 1 | 5 | 5 |
| CP overhead | 11.11% | 6.67% | 4.00% | 1.33% |

TABLE 3

| | Subcarrier spacing (KHz) | | |
|---|---|---|---|
| | 15 | 15 | 15 |
| Useful duration T_u (us) | 66.667 | 66.667 | 66.667 |
| CP length (us) | 8.333 | 5.2/4.7 | 2.31/2.28 |
| CP length in Ts(=32.55 ns) | 256 | 160/144 | 71/70 |
| # of symbols per TTI | 2 | 1/6 | 18/11 |
| TTI (ms) | 0.150 | 0.5 | 2 |
| CP overhead | 11.11% | 6.67% | 3.33% |

TABLE 4

| | Subcarrier spacing (KHz) | | | |
|---|---|---|---|---|
| | 30 | 30 | 30 | 30 |
| Useful duration T_u (us) | 33.333 | 33.333 | 33.333 | 33.333 |
| CP length (us) | 4.167 | 2.4/2.38 | 3.71/3.65 | 1.17/1.14 |
| CP length in Ts(=32.55 ns) | 128 | 74/73 | 114/112 | 36/35 |
| # of symbols per TTI | 4 | 1/6 | 8/1 | 9/20 |
| TTI (ms) | 0.150 | 0.250 | 0.333 | 1 |
| CP overhead | 11.11% | 6.67% | 10.00% | 3.33% |

TABLE 5

| | Subcarrier spacing (KHz) | | | |
|---|---|---|---|---|
| | 60 | 60 | 60 | 60 |
| Useful duration T_u (us) | 16.667 | 16.667 | 16.667 | 16.667 |
| CP length (us) | 1.2/1.17 | 2.083 | 1.53/1.37 | 0.88/0.85 |
| CP length in Ts(=32.55 ns) | 37/36 | 64 | 47/42 | 27/26 |
| # of symbols per TTI | 4/3 | 8 | 10/1 | 18/1 |
| TTI (ms) | 0.125 | 0.150 | 0.200 | 0.333 |
| CP overhead | 6.67% | 11.11% | 8.33% | 5.00% |

TABLE 6

| Configuration | SC-Spacing | Symbol Dur. (μs) | CP-Prefix (μs) | TTI (ms) |
|---|---|---|---|---|
| MTC Low Latency | 7.5 | 133.333 | 16.667 | 0.15 |
| MTC Delay Tolerant | 7.5 | 133.333 | 16.667 | 1.5 |
| High Mobility | 30 | 33.333 | 3.71/3.65 | 0.333 |
| LTE Comp. | 15 | 66.7 | 5.2/4.69 | 1 |

Figure 9:
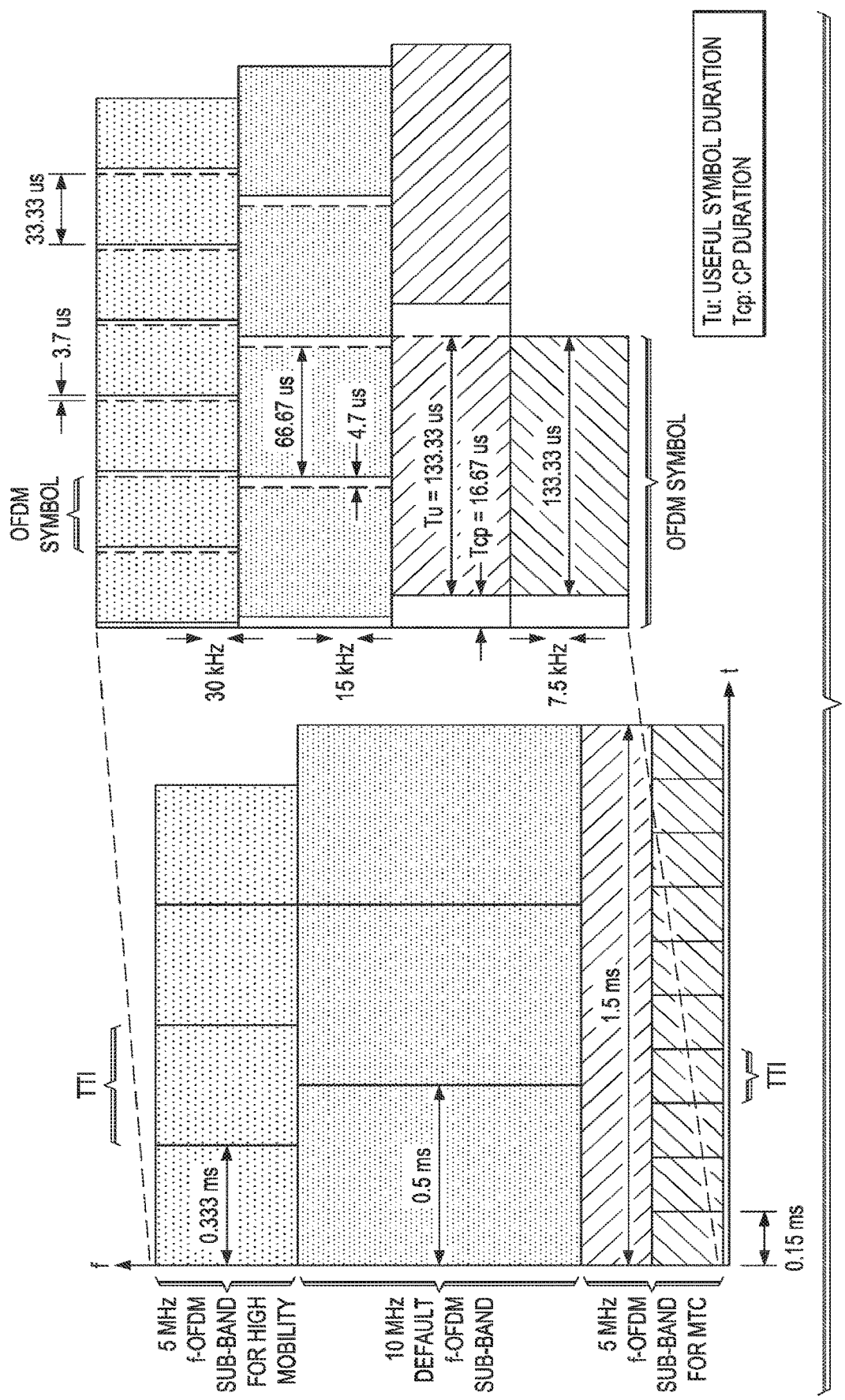
FIG. 9 illustrates a diagram of yet another embodiment f-OFDM configuration.

FIG. 9 is a diagram illustrating an embodiment f-OFDM configuration for supporting adaptive frame formats. In this embodiment, the 4 frame formats listed in Table 6 are communicated in 3 f-OFDM subbands of a 20 MHz spectrum. With the use of f-OFDM, the OFDM total symbol durations (cyclic prefix+useful symbol duration) corresponding to different frame structure configurations do not need to be aligned as shown in the figure. That is, non-orthogonal sets of parameters can co-exist. For example, the 30 kHz ("High mobility") configuration has an OFDM total symbol duration of around 37□s whereas the 15 kHz ("LTE compatible") configuration has an OFDM total symbol duration of around 71□s.

Figure 10:
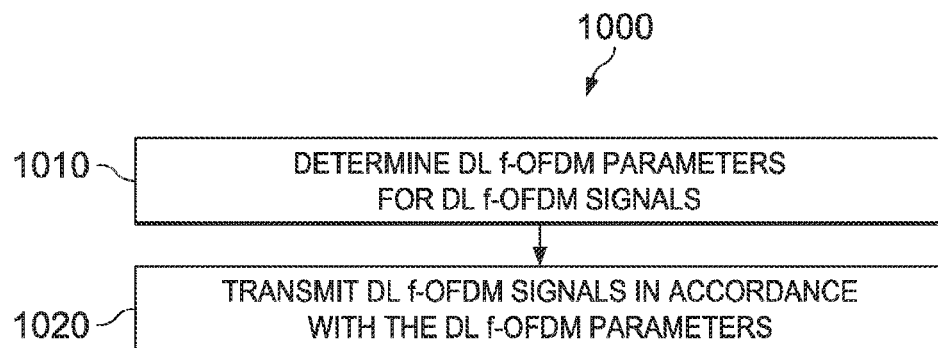
FIG. 10 illustrates a flowchart of an embodiment method for configuring a downlink f-OFDM frame.

F-OFDM parameters can be communicated in a control channel of a default f-OFDM frame. FIG. 10 illustrates a flowchart of an embodiment method 1000 for configuring a downlink f-OFDM frame, as may be performed by a transmitter. As shown, the method 1000 begins at step 1010, where the transmitter determines f-OFDM parameters for f-OFDM signals. Thereafter, the method 1000 proceeds to step 1020, where the transmitter transmits the f-OFDM signals in accordance with the f-OFDM parameters. The DL f-OFDM parameters may include sub-band information and frame parameters. The sub-band information may include indexes of sub-bands, offsets from a reference value, or any other information associated with a sub-band. The frame parameters may identify a subcarrier spacing, a symbol duration, an overhead configuration (e.g., cyclic prefix (CP) length, etc.), a transmission time interval (TTI) duration, or any other parameter corresponding to the structure of an f-OFDM frame. The frame parameters may include indexes of a parameter set, indexes of individual parameters, or any other index, parameter, or value associated with a frame structure.

Figure 11:
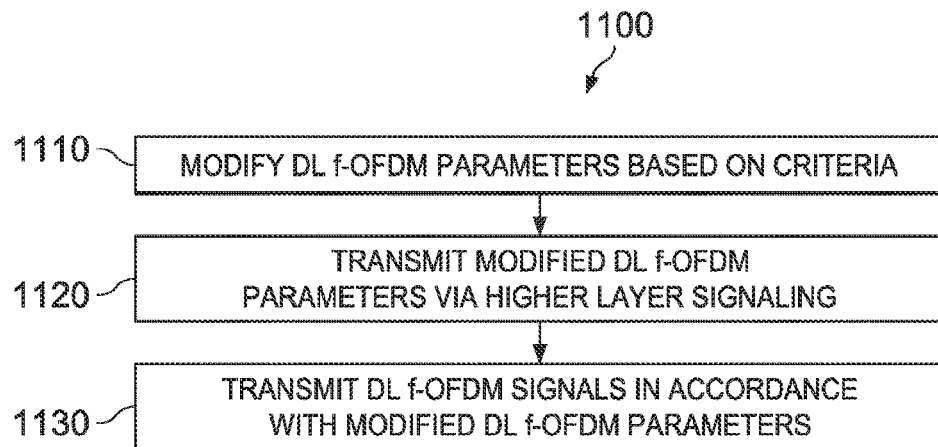
FIG. 11 illustrates a flowchart of an embodiment method for modifying downlink f-OFDM parameters.

F-OFDM parameters can be communicated via higher-layer signaling. FIG. 11 illustrates a flowchart of an embodiment method 1100 for modifying downlink (DL) f-OFDM parameters, as may be performed by a transmitter. As shown, the method 1100 begins at step 1110, where the transmitter modifies DL f-OFDM parameters for DL f-OFDM signals based on criteria. The criteria may include a characteristic of data carried by the DL f-OFDM signals, a characteristic of a channel, a characteristic of the transmitter, or a characteristic of a receiver assigned to receive the DL f-OFDM signals (or a combination thereof). Thereafter, the method 1100 proceeds to step 1120, where the transmitter transmits the DL f-OFDM parameters via higher-layer signaling, e.g., radio resource control (RRC) signaling, etc. Finally, the method 1100 proceeds to step 1130, where the transmitter transmits the DL f-OFDM signals in accordance with the DL f-OFDM parameters.

Figure 12:
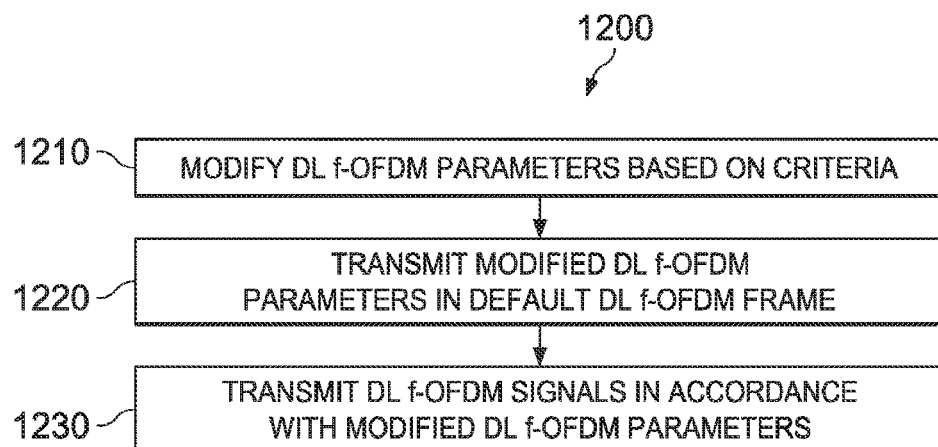
FIG. 12 illustrates a flowchart of another embodiment method for modifying downlink f-OFDM parameters.

F-OFDM parameters can be communicated via a default f-OFDM frame. FIG. 12 illustrates a flowchart of an embodiment method 1200 for modifying DL f-OFDM parameters, as may be performed by a transmitter. As shown, the method 1200 begins at step 1210, where the transmitter modifies DL f-OFDM parameters for DL f-OFDM signals based on criteria. Thereafter, the method 1200 proceeds to step 1220, where the transmitter transmits the modified DL f-OFDM parameters via a default DL f-OFDM frame. The f-OFDM parameters may be communicated in a control channel of the default DL f-OFDM frame. Finally, the method 1200 proceeds to step 1230, where the transmitter transmits the DL f-OFDM signals in accordance with the DL f-OFDM parameters.

Figure 13:
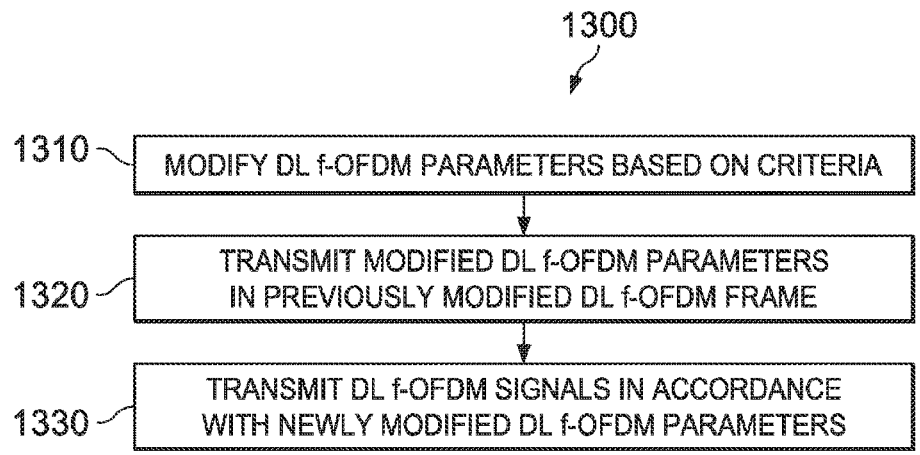
FIG. 13 illustrates a flowchart of yet another embodiment method for modifying downlink f-OFDM parameters.

F-OFDM parameters can be communicated via a previously modified f-OFDM frame. FIG. 13 illustrates a flowchart of an embodiment method 1300 for modifying DL f-OFDM parameters, as may be performed by a transmitter. As shown, the method 1300 begins at step 1310, where the transmitter modifies DL f-OFDM parameters for DL f-OFDM signals based on criteria. Thereafter, the method 1300 proceeds to step 1320, where the transmitter transmits the modified DL f-OFDM parameters via a previously modified f-OFDM frame. The DL f-OFDM parameters may be communicated in a control channel of the previously modified DL f-OFDM frame. Finally, the method 1300 proceeds to step 1330, where the transmitter transmits the DL f-OFDM signals in accordance with the newly modified DL f-OFDM parameters. This method may be particularly useful for modifications that affect mobile devices using other frame structures in other f-OFDM sub-bands, e.g., modifying other f-OFDM sub-band sizes, SC spacing, total symbol duration, and overhead duration.

Figure 14:
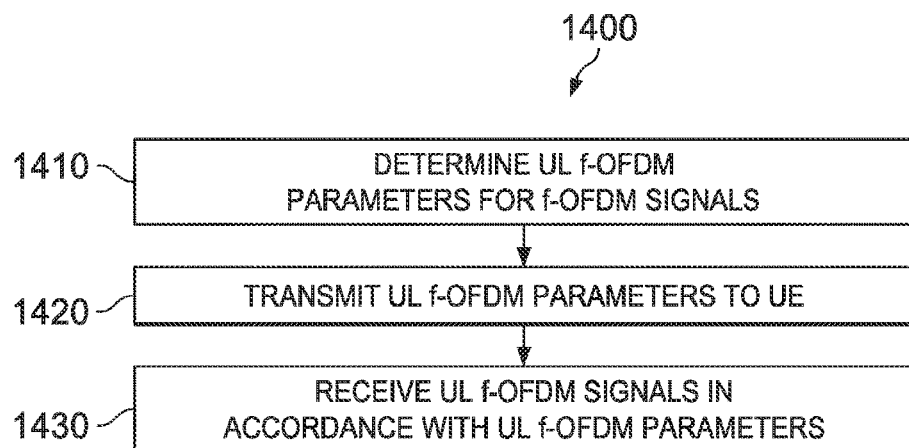
FIG. 14 illustrates a flowchart of an embodiment method for configuring an uplink f-OFDM frame.

It is also possible to configure uplink (UL) f-OFDM frames. FIG. 14 illustrates a flowchart of an embodiment method 1400 for configuring an uplink f-OFDM frame, as may be performed by a base station. As shown, the method 1400 begins at step 1410, where the base station determines UL f-OFDM parameters for f-OFDM signals. Thereafter, the method 1400 proceeds to step 1420, where the base station transmits the UL f-OFDM parameters to a mobile device. The UL f-OFDM parameters may be communicated via higher layer signaling or in a control channel of a downlink f-OFDM frame (e.g., default, modified, or otherwise). Finally, the method 1400 proceeds to step 1430, where the base station receives the f-OFDM signals in accordance with the UL f-OFDM parameters.

Figure 15:
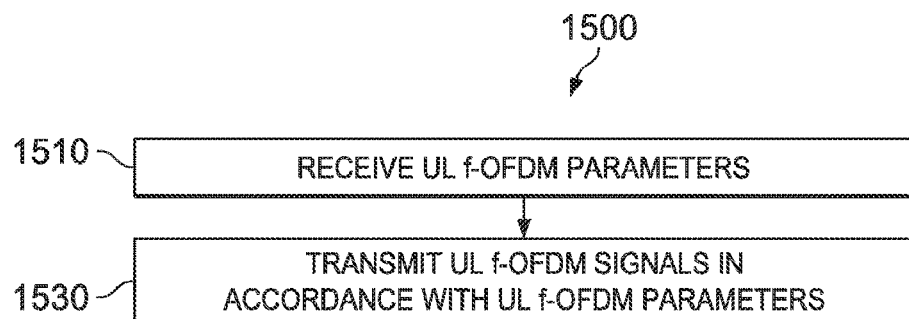
FIG. 15 illustrates a flowchart of another embodiment method for transmitting an uplink f-OFDM frame in accordance with uplink f-OFDM parameters.

FIG. 15 illustrates a flowchart of an embodiment method 1500 for transmitting an UL f-OFDM frame, as may be performed by a mobile device. As shown, the method 1500 begins at step 1510, where the mobile device receives UL f-OFDM parameters from a base station. The UL f-OFDM parameters may be communicated via higher layer signaling or in a control channel of a downlink f-OFDM frame (e.g., default, modified, or otherwise). Thereafter, the method 1500 proceeds to step 1520, where the mobile device transmits UL f-OFDM signals in accordance with the UL f-OFDM parameters. If UL f-OFDM parameters are not pre-defined (e.g., there is no default UL f-OFDM frame), then a mobile device may obtain frame structure information from DL related signaling on initial access. If UL f-OFDM parameters are pre-defined, then a mobile device may transmit on the UL in the default frame structure without waiting for the UL f-OFDM parameters to be signaled by the base station. Thus, pre-configure the initial frame structure and f-OFDM sub-band may reduce overhead.

Figure 16:
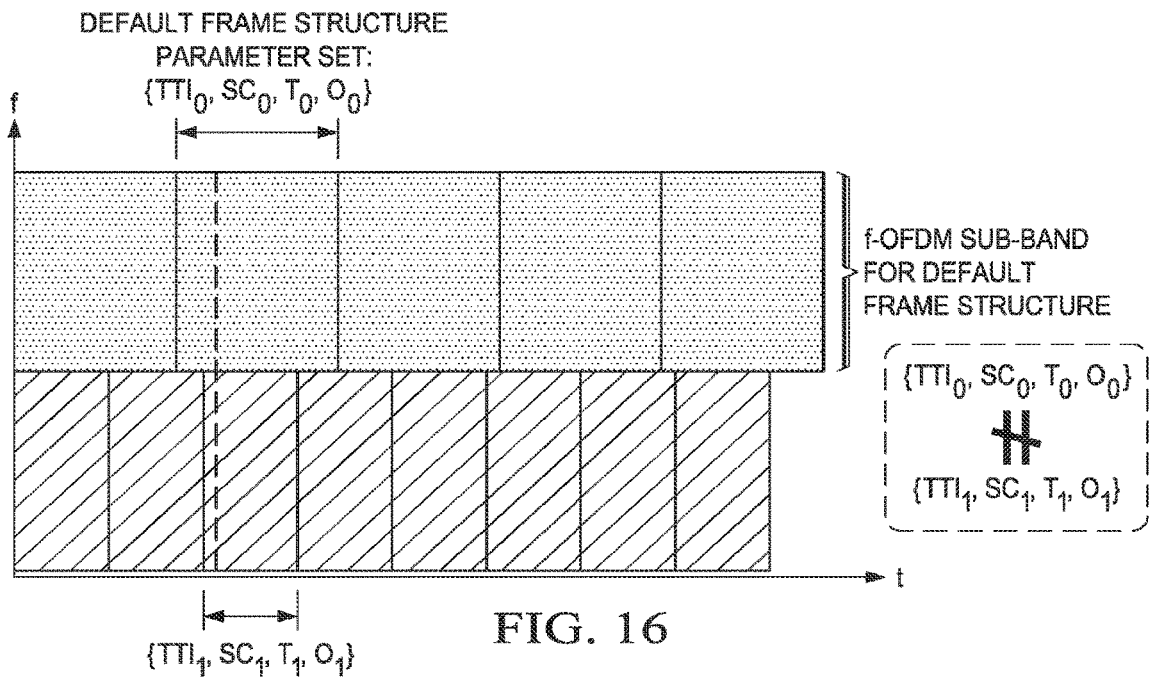
FIG. 16 illustrates a diagram of yet another embodiment f-OFDM configuration.
Figure 17:
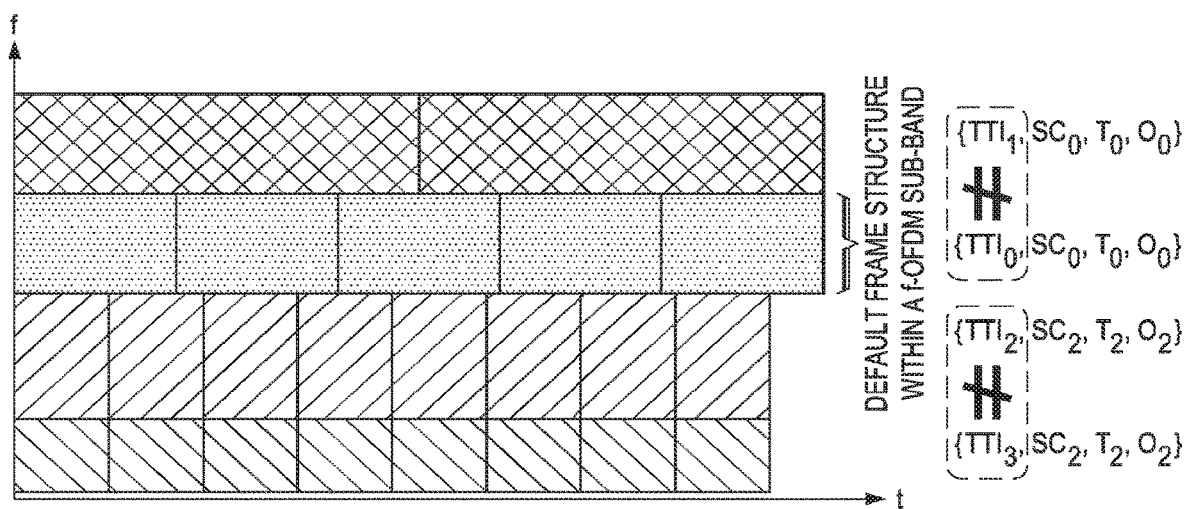
FIG. 17 illustrates a diagram of yet another embodiment f-OFDM configuration.
Figure 18:
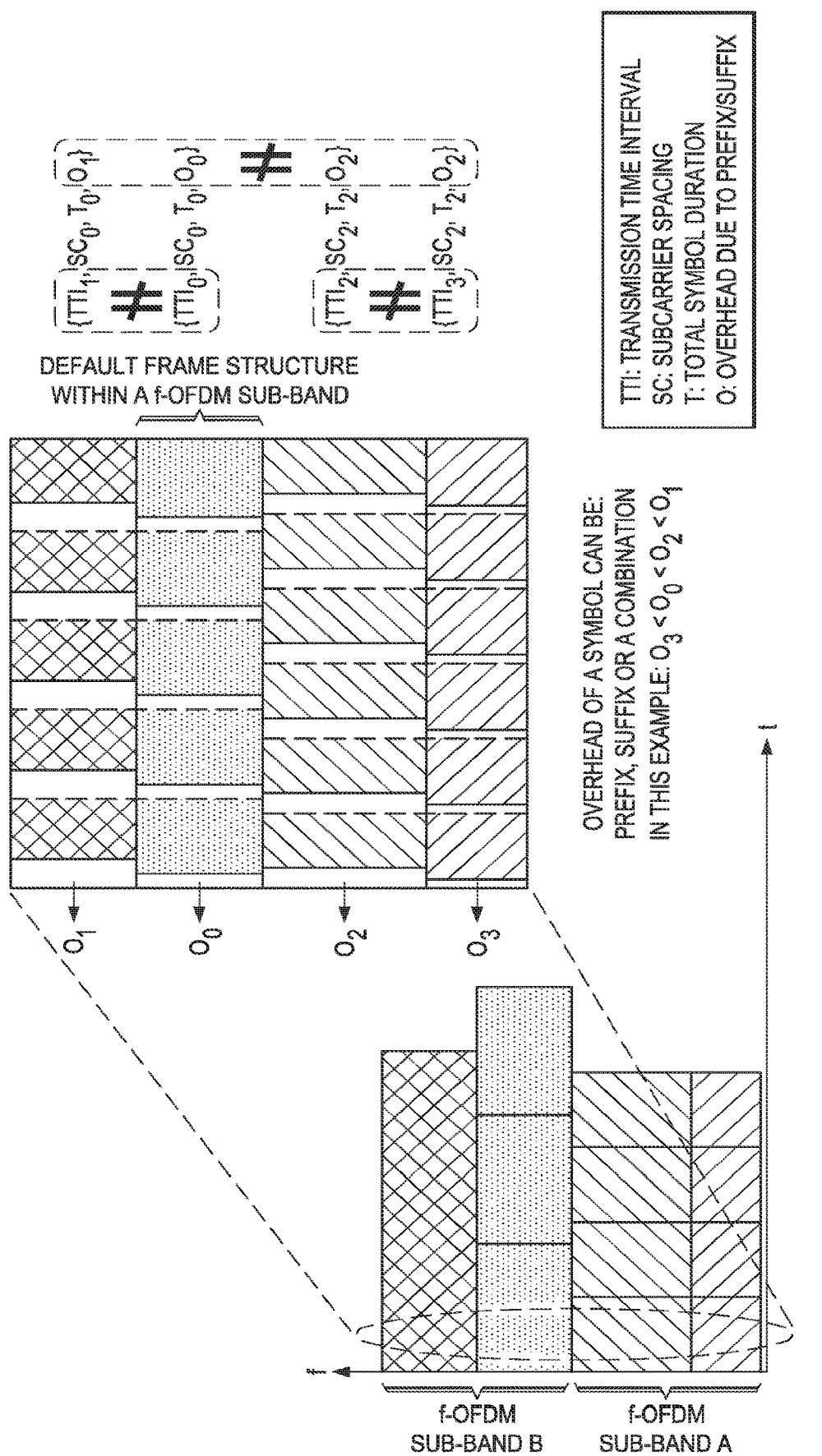
FIG. 18 illustrates a diagram of yet another embodiment f-OFDM configuration.
Figure 19:
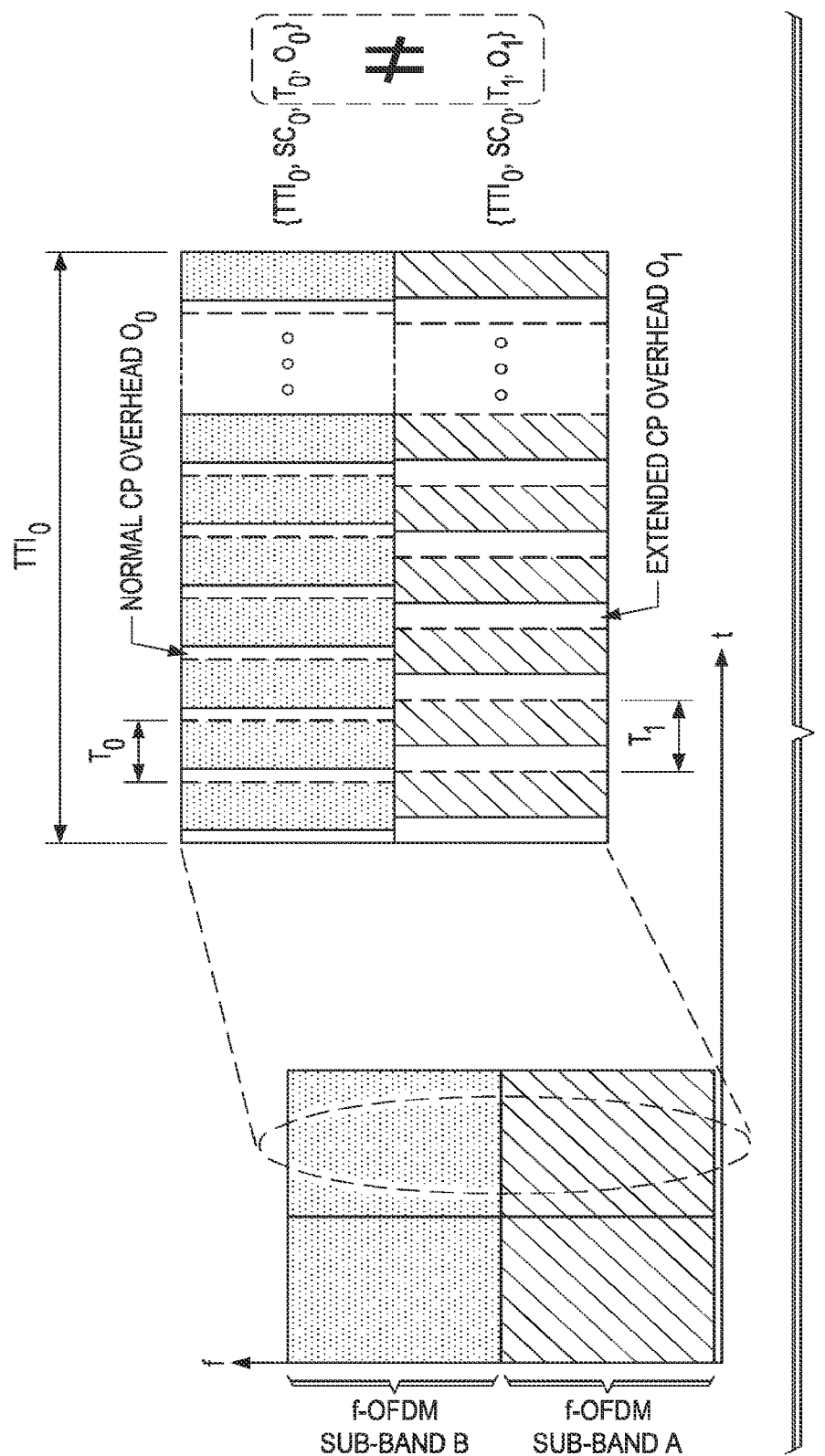
FIG. 19 illustrates a diagram of yet another embodiment f-OFDM configuration.

FIGS. 16-19 illustrate embodiment f-OFDM configurations. In those figures, transmission time interval parameters are designated as "TI," sub-carrier spacing parameters are designated as "SC," total symbol duration parameters are designated as "T," and symbol overhead due to cyclic prefix, cyclic suffix or zero tails is designated as "O." FIG. 16 illustrates a different frame structure on different f-OFDM sub-bands, and a same frame structure within a f-OFDM sub-band, according to an embodiment. FIG. 17 illustrates a different frame structure on different f-OFDM sub-bands, and different TTI lengths within a f-OFDM sub-band, according to an embodiment. The sub-carrier spacing, total symbol duration and symbol overhead, however, are the same within a f-OFDM sub-band. FIG. 18 illustrates different frame structures on different f-OFDM sub-bands, and different TII lengths and symbol overhead within a f-OFDM sub-band, according to an embodiment. For example, this example may use zero-tail DFT-s-OFDM or adjustable zero-tail DFT-s-OFDM to provide the different symbol overhead. FIG. 19 illustrates a backward compatible extension (LTE frame structures), according to an embodiment. This may include normal and extended CP frame structures on different f-OFDM sub-bands occurring simultaneously.

Figure 20:
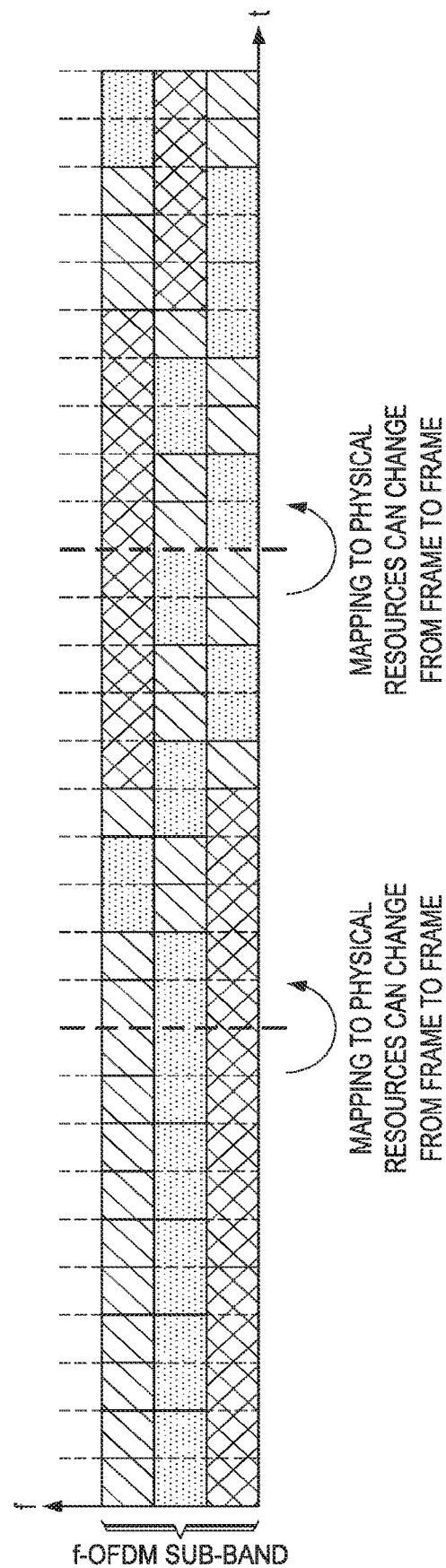
FIG. 20 illustrates an example of an intra-f-OFDM adaptive TTI configuration.

FIG. 20 illustrates an example of an intra-f-OFDM adaptive TTI configuration, according to an embodiment. In this embodiment, a set of mappings (patterns) of logical TTI resources to physical TTI resources in a time duration (e.g., a radio frame of 10 ms) is defined. Mapping can be changed from frame to fame (e.g., by cycling through a predefined set of mappings or by signaling. The mapping can be of localized or distributed types. With localized TTI mapping, a TTI length occupies physical resources in the same bandwidth for the duration of a frame. With distributed TTI mapping, different TTI lengths can hop across the entire bandwidth as shown in FIG. 20. This allows for the exploitation of frequency diversity.

In accordance with an embodiment, a method for transmitting signals in a wireless network is provided. In this example, the method includes transmitting a first filtered-orthogonal frequency division multiplexing (f-OFDM) signal, and transmitting a second f-OFDM signal. The first f-OFDM signal and the second f-OFDM signal are communicated in accordance with different sub-carrier spacings than one another. The first f-OFDM signal and the second f-OFDM signal may carry symbols having different cyclic prefix (CP) lengths than one another. The first f-OFDM signal and the second f-OFDM signal may be transmitted over the same frequency sub-band during different transmission time intervals (TTIs). The first f-OFDM signal and the second f-OFDM signal may be transmitted over different frequency sub-bands during the same time period.

The method may further comprise assigning a first frame format to the first f-OFDM signal and a second frame format to the second f-OFDM signal. The first frame format may require a different CP length and a different sub-carrier spacing than the second frame format. In an embodiment, assigning the first frame format to the first f-OFDM signal comprises selecting the first frame format based on a characteristic of data to be carried by the first f-OFDM signal. The characteristic of the data to be carried by the first f-OFDM signal may comprise a latency requirement, a delay tolerance requirement, a traffic type, a service type, or a combination thereof. In another embodiment, assigning the first frame format to the first f-OFDM signal comprises selecting the first frame format based on a characteristic of a wireless channel over which the first f-OFDM signal is to be transmitted. The characteristic of the wireless channel comprises a multipath delay of the wireless channel. In yet another embodiment, assigning the first frame format to the first f-OFDM signal comprises selecting the first frame format based on a serving region size of the transmitter. In yet another embodiment, assigning the first frame format comprises selecting the first frame format based on a characteristic of a receiver associated with the first f-OFDM signal. The characteristic of the receiver associated with the first f-OFDM signal may comprise a mobility speed of the receiver.

In an embodiment, the first f-OFDM signal and the second f-OFDM signal are received by a receiver. The first f-OFDM signal may be communicated in accordance with a default frame format that is known by the receiver. The first f-OFDM signal may indicate that the second f-OFDM signal will be communicated in accordance with a frame format that is different than the default frame format.

In accordance with another embodiment, a method for receiving signals in a wireless network is provided. In this example, the method includes receiving a first filtered-orthogonal frequency division multiplexing (f-OFDM) signal, and receiving a second f-OFDM signal. The first f-OFDM signal and the second f-OFDM signal are communicated in accordance with different sub-carrier spacings than one another. The first f-OFDM signal and the second f-OFDM signal may carry symbols having different cyclic prefix (CP) lengths than one another. The first f-OFDM signal and the second f-OFDM signal may be received over the same frequency sub-band during different transmission time intervals (TTIs). The first f-OFDM signal and the second f-OFDM signal may be received over different frequency sub-bands during the same time period. The first f-OFDM may be communicated in accordance with a default frame format that is known by the receiver, and the first f-OFDM signal may indicate that the second f-OFDM signal will be communicated in accordance with a frame format that is different than the default frame format.

Figure 21:
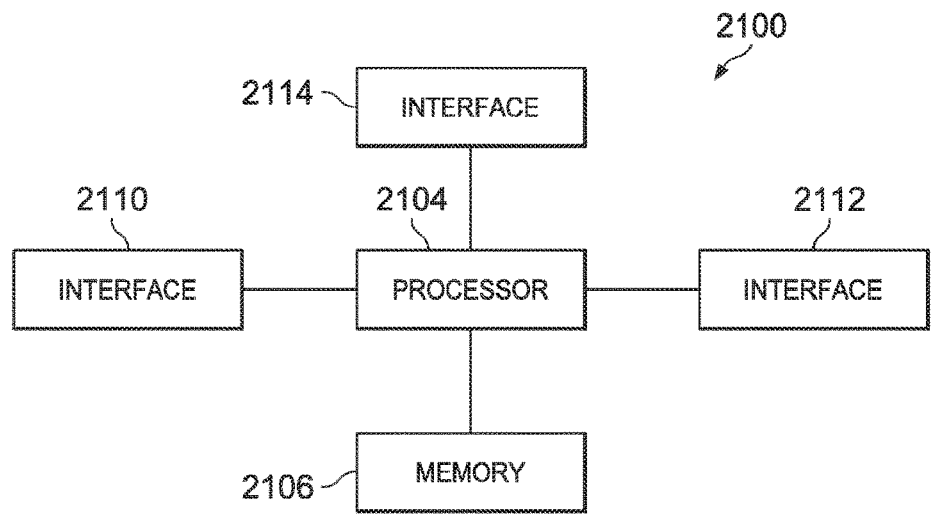
FIG. 21 illustrates a diagram of an embodiment communications device.

FIG. 21 illustrates a block diagram of an embodiment processing system 2100 for performing methods described herein, which may be installed in a host device. As shown, the processing system 2100 includes a processor 2104, a memory 2106, and interfaces 2110-2114, which may (or may not) be arranged as shown in FIG. 21. The processor 2104 may be any component or collection of components adapted to perform computations and/or other processing related tasks, and the memory 2106 may be any component or collection of components adapted to store programming and/or instructions for execution by the processor 1504. In an embodiment, the memory 2106 includes a non-transitory computer readable medium. The interfaces 2110, 2112, 2114 may be any component or collection of components that allow the processing system 2100 to communicate with other devices/components and/or a user. For example, one or more of the interfaces 2110, 2112, 2114 may be adapted to communicate data, control, or management messages from the processor 2104 to applications installed on the host device and/or a remote device. As another example, one or more of the interfaces 2110, 2112, 2114 may be adapted to allow a user or user device (e.g., personal computer (PC), etc.) to interact/communicate with the processing system 2100. The processing system 2100 may include additional components not depicted in FIG. 21, such as long term storage (e.g., non-volatile memory, etc.).

In some embodiments, the processing system 2100 is included in a network device that is accessing, or part otherwise of, a telecommunications network. In one example, the processing system 2100 is in a network-side device in a wireless or wireline telecommunications network, such as a base station, a relay station, a scheduler, a controller, a gateway, a router, an applications server, or any other device in the telecommunications network. In other embodiments, the processing system 2100 is in a user-side mobile device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 22:
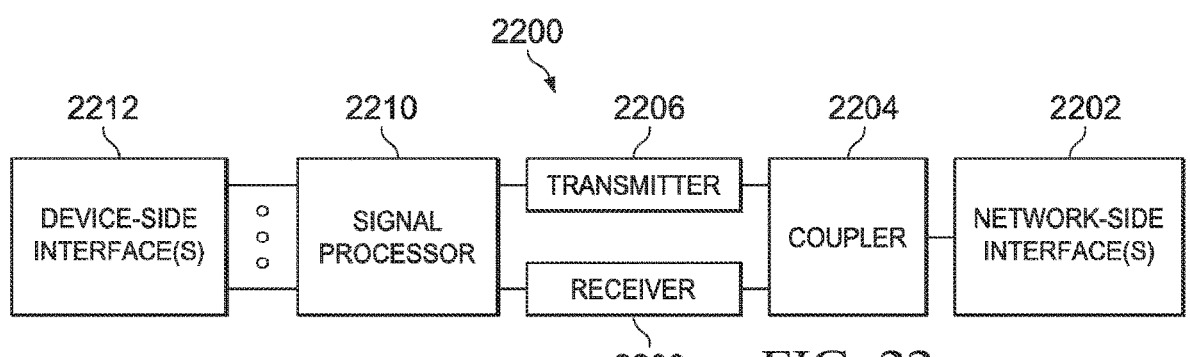
FIG. 22 illustrates a diagram of an embodiment computing platform.

In some embodiments, one or more of the interfaces 2110, 2112, 2114 connects the processing system 2100 to a transceiver adapted to transmit and receive signaling over the telecommunications network. FIG. 22 illustrates a block diagram of a transceiver 2200 adapted to transmit and receive signaling over a telecommunications network. The transceiver 2200 may be installed in a host device. As shown, the transceiver 2200 comprises a network-side interface 2202, a coupler 2204, a transmitter 2206, a receiver 2208, a signal processor 2210, and a device-side interface 2212. The network-side interface 2202 may include any component or collection of components adapted to transmit or receive signaling over a wireless or wireline telecommunications network. The coupler 2204 may include any component or collection of components adapted to facilitate bi-directional communication over the network-side interface 2202. The transmitter 2206 may include any component or collection of components (e.g., up-converter, power amplifier, etc.) adapted to convert a baseband signal into a modulated carrier signal suitable for transmission over the network-side interface 2202. The receiver 2208 may include any component or collection of components (e.g., down-converter, low noise amplifier, etc.) adapted to convert a carrier signal received over the network-side interface 2202 into a baseband signal. The signal processor 2210 may include any component or collection of components adapted to convert a baseband signal into a data signal suitable for communication over the device-side interface(s) 2212, or vice-versa. The device-side interface(s) 2212 may include any component or collection of components adapted to communicate data-signals between the signal processor 2210 and components within the host device (e.g., the processing system 2100, local area network (LAN) ports, etc.).

The transceiver 2200 may transmit and receive signaling over any type of communications medium. In some embodiments, the transceiver 2200 transmits and receives signaling over a wireless medium. For example, the transceiver 2200 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 2202 comprises one or more antenna/radiating elements. For example, the network-side interface 2202 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 2200 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

In an embodiment, a method for transmitting signals in a wireless network is provided. In this embodiment, the method includes communicating, by a wirelessly-enabled device, a first orthogonal frequency division multiplexing (OFDM) signal using a first frame structure configuration; and communicating, by the wirelessly-enabled device, a second OFDM signal using a second frame structure configuration. The first OFDM signal at least partially overlapping the second OFDM signal in the time-domain. The first frame structure configuration is at least partially misaligned with the second frame structure configuration in the time domain such that at least some pairs of overlapping slots in the first and second frame structure configurations have different starting or ending slot locations. In one example, the first OFDM signal and the second OFDM signal carry symbols have different cyclic prefix (CP) lengths than one another. In the same example or another example, the first OFDM signal and the second OFDM signal are transmitted over different frequency sub-bands. In any one of the preceding examples, or in another example, starting locations of all slots in the first frame structure configuration are offset from starting locations of all slots in the second frame structure. In such an example, slots in the first frame structure configuration may have the same periodic duration as slots in the second frame structure configuration. Alternatively, in such an example, slots in the first frame structure configuration have a different periodic duration as slots in the second frame structure configuration. In any one of the preceding examples, or in another example, the wirelessly-enabled device is a mobile device or an access point. An apparatus and computer program product for performing this method are also provided.

In accordance with an embodiment, a method for transmitting signals in a wireless network is provided. In this example, the method includes transmitting, by a transmitter, a first transmission in a default sub-band with default orthogonal frequency divisional multiplexing (OFDM) parameters to a first user equipment (UE) when the UE initially accesses a network, and transmitting, by the transmitter, higher-layer signaling to the first UE in the default sub-band. The higher-layer signaling indicates at least one first OFDM additional parameters and one second OFDM parameters. The first OFDM additional parameters includes a first additional sub-band information and a first additional frame structure parameters, and the second OFDM parameters includes a second additional sub-band information and a second additional frame structure parameters. The first additional sub-band occupies a different frequency bandwidth partition than the second additional sub-band. A first sub-carrier spacing in the first additional frame structure parameters is different than a second sub-carrier spacing in the second additional frame structure parameters. The sub-carrier spacing in the default frame structure parameters comprises 15 kilohertz (kHz) and 30 kHz, and each of the first sub-carrier spacing and the second sub-carrier spacing is one from a predefined sub-carrier spacing set of 7.5 kHz, 15 kHz, 30 kHz, and 60 kHz. In one example, the bandwidth of the first additional sub band and the second additional sub band is 5 MHz. In the same example, or in another example, each of the first additional sub-band information and the second additional sub-band information comprises an index of a sub-band or an offset from a reference value associating with each sub-band. In any one of the above examples, or in another example, each of the first additional frame structure parameters and the second additional frame structure parameters further comprises cyclic prefix (CP) length and transmission time intervals (TTIs). In any one of the above examples, or in another example, the first additional frame structure parameters and the second additional frame structure parameters includes an index for each sub-carrier spacing. In any one of the above examples, or in another example, before the step of transmitting the first transmission, the method further comprises continuously transmitting, by the transmitter, the default frame structure parameters in time; or periodically transmitting, by the transmitter, the default frame structure parameters. In any one of the above examples, or in another example, a frame format (e.g., the frame format 302 from FIG. 3) is assigned to a semi-static allocation period (e.g., the semi-static allocation period 331), and another frame format (e.g., the frame format 309) is assigned to another semi-static allocation period (e.g., the semi-static allocation period 332). In any one of the above examples, or in another example, the default sub-band is a default filtered-orthogonal frequency-division multiplexing (f-OFDM) sub-band, and the additional sub-band is an additional f-OFDM sub-band.

In accordance with another embodiment, a method for transmitting signals in a wireless network is provided. In this example, the method includes transmitting, by a transmitter, a first transmission in a default sub-band with default orthogonal frequency divisional multiplexing (OFDM) parameters to a first user equipment (UE) when the UE initially accesses a network, and transmitting, by the transmitter, higher-layer signaling to the first UE in the default sub-band. The higher-layer signaling indicates at least a first set of alternative OFDM parameters and a second set of alternative OFDM parameters, the first set of alternative OFDM parameters including at least a first alternative sub-band, and a first alternative frame structure, and the second set of alternative OFDM parameters including a second alternative sub-band and a second alternative frame structure, wherein the first alternative sub-band occupies a different frequency bandwidth partition than the second alternative sub-band. The default frame structure parameters comprises at least one of a 15 kilohertz (kHz) subcarrier spacing and 30 kHz subcarrier spacing. The first frame structure and the second frame structure include one of a 7.5 kHz sub-carrier spacing, a 15 kHz sub-carrier spacing, a 30 kHz sub-carrier spacing, and a 60 kHz sub-carrier spacing. The first frame structure has a different sub-carrier spacing than the second frame structure. In one example, each of the first sub-band and the second—sub-band have a 5 megahertz (MHz) bandwidth. In the same example, or in another example, each of the first sub-band and the second sub-band are associated with an index of sub-band or offset from a reference value associating with each sub-band, the index or the offset being indicating by the higher-layer signaling. In any one of the above examples, or in another example, each of the first frame structure and the second frame structure comprises cyclic prefix (CP) length and transmission time intervals (TTIs). In any one of the above examples, or in another example, the first plurality of OFDM parameters includes a first index for a first sub-carrier spacing of the first frame structure, and wherein the second plurality of OFDM parameters includes a second index for a second sub-carrier spacing of the second frame structure. In such an example, the first sub-carrier spacing of the first frame structure may be different than the second sub-carrier spacing of the second frame structure. In any one of the above examples, or in another example, before the step of transmitting the first transmission, the method further comprises continuously transmitting, by the transmitter, the default frame structure parameters in time. In any one of the above examples, or in another example, the method further comprises periodically transmitting, by the transmitter, the default frame structure parameters. In any one of the above examples, or in another example, the default sub-band is a default filtered-orthogonal frequency-division multiplexing (f-OFDM) sub-band, and the first alternative sub-band is an alternative f-OFDM sub-band.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for transmitting signals in a wireless network, the method comprising:
   transmitting, by a transmitter, to a user equipment (UE), higher-layer signaling that indicates first frame structure parameters and a first sub-band; and
   communicating, by the transmitter, with the UE, a first signal in the first sub-band using the first frame structure parameters,
   wherein the first frame structure parameters comprise a first sub-carrier spacing, and wherein the higher-layer signaling comprises a first index for configuring the first sub-carrier spacing, a second index for configuring the first sub-band and/or a frequency offset from a reference value associated with the first sub-band.

2. The method of claim 1, wherein the first frame structure parameters further comprise a first cyclic prefix length, and the higher-layer signaling comprises the first index for configuring the first sub-carrier spacing and the first cyclic prefix length; and/or
   wherein the first frame structure parameters further comprise a first symbol duration, the higher-layer signaling comprises the first index for configuring the first sub-carrier spacing and a length of the first symbol duration.

3. The method of claim 1, wherein the first frame structure parameters comprise a transmission time interval (TTI), the method further comprising:
   transmitting, by the transmitter, to the UE, a parameter for configuring a length of the TTI.

4. The method of claim 1, wherein the first sub-carrier spacing is 15 kilohertz (kHz), 30 kHz, or 60 kHz.

5. The method of claim 1, wherein the first sub-band is a first filtered-orthogonal frequency division multiplexing (f-OFDM) sub-band.

6. The method of claim 1, the method further comprising:
   transmitting, by the transmitter, to the UE, downlink related signaling indicating default frame structure parameters when the UE initially accesses a network; and
   transmitting, by the transmitter, to the UE, a second signal in a default sub-band with the default frame structure parameters.

7. The method of claim 6, wherein the default sub-band and the first sub-band are non-overlapping sub-bands in a same system bandwidth.

8. The method of claim 6, wherein the default frame structure parameters comprise a second sub-carrier spacing, and the second sub-carrier spacing is 15 kilohertz (kHz), 30 kHz, or 60 kHz.

9. The method of claim 1, wherein the higher-layer signaling is transmitted via default frame structure parameters or a second frame structure parameters.

10. The method of claim 9, further comprising:
    before transmitting the higher-layer signaling, communicating, by the transmitter, with the UE, a second signal in a second sub-band with the second frame structure parameters, wherein the second sub-band and the first sub-band are non-overlapping sub-bands in a same system bandwidth.

11. The method of claim 1, further comprising:
    continuously or periodically transmitting, by the transmitter, a set of default frame structure parameters in time.

12. The method of claim 1, wherein the first frame structure parameters correspond to a frame format assigned to a semi-static allocation period.

13. A transmitter comprising:
    a processor; and
    a non-transitory computer readable storage medium storing programming for execution by the processor, the programming including instructions to:
    transmit, to a user equipment (UE), higher-layer signaling that indicates first frame structure parameters and a first sub-band; and
    communicate, with the UE, a first signal in the first sub-band using the first frame structure parameters,
    wherein the first frame structure parameters comprise a first sub-carrier spacing, and wherein the higher-layer signaling comprises a first index for configuring the first sub-carrier spacing, a second index for configuring the first sub-band and/or a frequency offset from a reference value associated with the first sub-band.

14. The transmitter of claim 13, wherein the first frame structure parameters further comprise a first cyclic prefix length, and the higher-layer signaling comprises the first index for configuring the first sub-carrier spacing and the first cyclic prefix length; and/or
    wherein the first frame structure parameters further comprise a first symbol duration, the higher-layer signaling comprises the first index for configuring the first sub-carrier spacing and a length of the first symbol duration.

15. The transmitter of claim 13, wherein the first frame structure parameters comprise a transmission time interval (TTI), and wherein the programming further includes instructions to:
    transmit to the UE a parameter for configuring a length of the TTI.

16. The transmitter of claim 13, wherein the first sub-carrier spacing is 15 kilohertz (kHz), 30 kHz, or 60 kHz.

17. The transmitter of claim 13, wherein the first sub-band is a first filtered-orthogonal frequency division multiplexing (f-OFDM) sub-band.

18. The transmitter of claim 13, wherein the programming further includes instructions to:
    transmit, to the UE, downlink related signaling indicating default frame structure parameters when the UE initially accesses a network; and
    transmit, to the UE, a second signal in a default sub-band with the default frame structure parameters.

19. The transmitter of claim 18, wherein the default sub-band and the first sub-band are non-overlapping sub-bands in a same system bandwidth.

20. The transmitter of claim 18, wherein the default frame structure parameters comprise a second sub-carrier spacing, and the second sub-carrier spacing is 15 kilohertz (kHz), 30 kHz, or 60 kHz.

21. The transmitter of claim 13, wherein the higher-layer signaling is transmitted via default frame structure parameters or a second frame structure parameters.

22. The transmitter of claim 21, wherein the programming further includes instructions to:
    before transmitting the higher-layer signaling, communicate, with the UE, a second signal in a second sub-band with the second frame structure parameters, wherein the second sub-band and the first sub-band are non-overlapping sub-bands in a same system bandwidth.

23. A method for receiving signals in a wireless network, the method comprising:
- receiving, by an apparatus, from a transmitter, higher-layer signaling that indicates first frame structure parameters and a first sub-band; and
- communicating, by the apparatus, with the transmitter, a first signal in the first sub-band using the first frame structure parameters,
- wherein the first frame structure parameters comprise a first sub-carrier spacing, and wherein the higher-layer signaling comprises a first index for configuring the first sub-carrier spacing, a second index for configuring the first sub-band and/or a frequency offset from a reference value associated with the first sub-band.

24. The method of claim 23, wherein the first frame structure parameters further comprise a first cyclic prefix length, and the higher-layer signaling comprises the first index for configuring the first sub-carrier spacing and the first cyclic prefix length; and/or
- wherein the first frame structure parameters further comprise a first symbol duration, the higher-layer signaling comprises the first index for configuring the first sub-carrier spacing and a length of the first symbol duration.

25. The method of claim 23, wherein the first frame structure parameters comprise a transmission time interval (TTI), the method further comprising:
- receiving, by the apparatus, from the transmitter, a parameter for configuring a length of the TTI.

26. The method of claim 23, wherein the first sub-carrier spacing is 15 kilohertz (kHz), 30 kHz, or 60 kHz.

27. The method of claim 23, wherein the first sub-band is a first filtered-orthogonal frequency division multiplexing (f-OFDM) sub-band.

28. The method of claim 23, the method further comprising:
- receiving, by the apparatus, from the transmitter, downlink related signaling indicating default frame structure parameters when the apparatus initially accesses a network; and
- receiving, by the apparatus, from the transmitter, a second signal in a default sub-band with the default frame structure parameters.

29. The method of claim 28, wherein the default sub-band and the first sub-band are non-overlapping sub-bands in a same system bandwidth.

30. The method of claim 28, wherein the default frame structure parameters comprise a second sub-carrier spacing, and the second sub-carrier spacing is 15 kilohertz (kHz), 30 kHz, or 60 kHz.

31. The method of claim 23, wherein the higher-layer signaling is transmitted via default frame structure parameters or a second frame structure parameters.

32. The method of claim 31, further comprising:
- before receiving the higher-layer signaling, communicating, by the apparatus, with the transmitter, a second signal in a second sub-band with the second frame structure parameters, wherein the second sub-band and the first sub-band are non-overlapping sub-bands in a same system bandwidth.

33. An apparatus comprising:
- a processor; and
- a non-transitory computer readable storage medium storing programming for execution by the processor, the programming including instructions to:
- receive, from a transmitter, higher-layer signaling that indicates first frame structure parameters and a first sub-band; and
- communicate, with the transmitter, a first signal in the first sub-band using the first frame structure parameters,
- wherein the first frame structure parameters comprise a first sub-carrier spacing, and wherein the higher-layer signaling comprises a first index for configuring the first sub-carrier spacing, a second index for configuring the first sub-band and/or a frequency offset from a reference value associated with the first sub-band.

34. The apparatus of claim 33, wherein the first frame structure parameters further comprise a first cyclic prefix length, and the higher-layer signaling comprises the first index for configuring the first sub-carrier spacing and the first cyclic prefix length; and/or
- wherein the first frame structure parameters further comprise a first symbol duration, the higher-layer signaling comprises the first index for configuring the first sub-carrier spacing and a length of the first symbol duration.

35. The apparatus of claim 33, wherein the first frame structure parameters comprise a transmission time interval (TTI), and wherein the programming further includes instructions to:
- receive, from the transmitter, a parameter for configuring a length of the TTI.

36. The apparatus of claim 33, wherein the first sub-carrier spacing is 15 kilohertz (kHz), 30 kHz, or 60 kHz.

37. The apparatus of claim 33, wherein the first sub-band is a first filtered-orthogonal frequency division multiplexing (f-OFDM) sub-band.

38. The apparatus of claim 33, wherein the programming further includes instructions to:
- receive, from the transmitter, downlink related signaling indicating default frame structure parameters when the apparatus initially accesses a network; and
- receive, from the transmitter, a second signal in a default sub-band with the default frame structure parameters.

39. The apparatus of claim 38, wherein the default sub-band and the first sub-band are non-overlapping sub-bands in a same system bandwidth.

40. The apparatus of claim 38, wherein the default frame structure parameters comprise a second sub-carrier spacing, and the second sub-carrier spacing is 15 kilohertz (kHz), 30 kHz, or 60 kHz.

41. The apparatus of claim 33, wherein the higher-layer signaling is transmitted via default frame structure parameters or a second frame structure parameters.

42. The apparatus of claim 41, wherein the programming further includes instructions to:
- before receiving the higher-layer signaling, communicate, with the transmitter, a second signal in a second sub-band with the second frame structure parameters, wherein the second sub-band and the first sub-band are non-overlapping sub-bands in a same system bandwidth.

43. A wireless network comprising:
- a backhaul network; and
- an access point (AP) communicatively coupled to the backhaul network, the AP configured to transmit, to a user equipment (UE), higher-layer signaling that indicates first frame structure parameters and a first sub-band and to communicate, with the UE, a first signal in the first sub-band using the first frame structure parameters, wherein the first frame structure parameters comprise a first sub-carrier spacing, and wherein the higher-layer signaling comprises a first index for configuring the first sub-carrier spacing, a second index for configuring the first sub-band and/or a frequency offset from a reference value associated with the first sub-band.

44. The wireless network of claim 43, wherein the first frame structure parameters further comprise a first cyclic prefix length, and the higher-layer signaling comprises the first index for configuring the first sub-carrier spacing and the first cyclic prefix length; and/or
wherein the first frame structure parameters further comprise a first symbol duration, the higher-layer signaling comprises the first index for configuring the first sub-carrier spacing and a length of the first symbol duration.

45. The wireless network of claim 43, wherein the first frame structure parameters comprise a transmission time interval (TTI), and wherein the AP is further configured to:
transmit to the UE a parameter for configuring a length of the TTI.

46. The wireless network of claim 43, wherein the first sub-carrier spacing is 15 kilohertz (kHz), 30 kHz, or 60 kHz.

47. The wireless network of claim 43, wherein the first sub-band is a first filtered-orthogonal frequency division multiplexing (f-OFDM) sub-band.

48. The wireless network of claim 43, wherein the AP is further configured to:
transmit, to the UE, downlink related signaling indicating default frame structure parameters when the UE initially accesses a network; and
transmit, to the UE, a second signal in a default sub-band with the default frame structure parameters.

49. The wireless network of claim 48, wherein the default sub-band and the first sub-band are non-overlapping sub-bands in a same system bandwidth.

50. The wireless network of claim 48, wherein the default frame structure parameters comprise a second sub-carrier spacing, and the second sub-carrier spacing is 15 kilohertz (kHz), 30 kHz, or 60 kHz.

51. The wireless network of claim 43, wherein the higher-layer signaling is transmitted via default frame structure parameters or a second frame structure parameters.

52. The wireless network of claim 51, wherein the AP is further configured to:
before transmitting the higher-layer signaling, communicate, with the UE, a second signal in a second sub-band with the second frame structure parameters, wherein the second sub-band and the first sub-band are non-overlapping sub-bands in a same system bandwidth.

* * * * *